US009758274B2

(12) United States Patent
Melmon et al.

(10) Patent No.: US 9,758,274 B2
(45) Date of Patent: Sep. 12, 2017

(54) PROTECTIVE CASE INCLUDING COVER DEPLOYABLE AS AN ADJUSTABLE SUPPORT STRUCTURE AND RELATED DEVICES, SYSTEMS, AND METHODS

(71) Applicant: Touchfire, Inc., Seattle, WA (US)

(72) Inventors: Bradley S. Melmon, Seattle, WA (US); Steven A. Isaac, Seattle, WA (US)

(73) Assignee: Touchfire, Inc., Seattle, WA (US)

( * ) Notice: Subject to any disclaimer, the term of this patent is extended or adjusted under 35 U.S.C. 154(b) by 80 days.

(21) Appl. No.: 14/733,860

(22) Filed: Jun. 8, 2015

(65) Prior Publication Data

US 2015/0266610 A1  Sep. 24, 2015

Related U.S. Application Data

(63) Continuation-in-part of application No. 14/149,799, filed on Jan. 7, 2014, now Pat. No. 9,540,134.

(60) Provisional application No. 62/009,835, filed on Jun. 9, 2014.

(51) Int. Cl.
*B65D 5/52* (2006.01)
*A45C 11/00* (2006.01)
*G06F 1/16* (2006.01)

(52) U.S. Cl.
CPC ............ *B65D 5/5206* (2013.01); *A45C 11/00* (2013.01); *G06F 1/1626* (2013.01); *A45C 2011/003* (2013.01); *A45C 2200/15* (2013.01); *G06F 2200/1633* (2013.01)

(58) Field of Classification Search
CPC ... B65D 5/5206; B65D 5/52; A45C 2011/002; A45C 2011/003; A45C 2011/001; G06F 1/1626; G06F 1/1628

USPC ................. 206/45.23, 320, 45.2, 45.24, 818
See application file for complete search history.

(56) References Cited

U.S. PATENT DOCUMENTS

| 8,714,351 | B2 * | 5/2014 | Toulotte | A45C 11/00 |
| | | | | 206/320 |
| 8,807,333 | B1 * | 8/2014 | Cooper | A45C 11/00 |
| | | | | 206/320 |
| 8,820,695 | B2 * | 9/2014 | Nakada | A45C 11/00 |
| | | | | 206/45.2 |
| 8,960,421 | B1 * | 2/2015 | Diebel | G06F 1/1628 |
| | | | | 206/320 |
| 9,266,641 | B2 | 2/2016 | Quehl | |
| 9,540,134 | B2 | 1/2017 | Melmon et al. | |

(Continued)

*Primary Examiner* — Steven A. Reynolds
(74) *Attorney, Agent, or Firm* — Perkins Coie LLP

(57) ABSTRACT

A protective case in accordance with an embodiment of the present technology includes a backing shaped to securely attach to a back side of a personal electronic device, a cover hingedly connected to the backing, and a joint operably positioned between the backing and the cover. The backing includes a first magnetic region. The cover includes a screen protector and a tab hingedly connected to the screen protector. The tab includes a second and third magnetic regions hingedly connected to one another. The joint is bendable along a bending axis to allow the cover to move between a closed configuration in which the first and second magnetic regions are detached from one another and an open configuration in which the first and second magnetic regions are releasably attached to one another. The first, second, and third magnetic regions have advantageous respective distributions of magnetic polarities.

22 Claims, 32 Drawing Sheets

(56) References Cited

U.S. PATENT DOCUMENTS

| | | | |
|---|---|---|---|
| 2011/0284420 A1* | 11/2011 | Sajid | G06F 1/1628 206/576 |
| 2012/0088557 A1 | 4/2012 | Liang | |
| 2012/0211377 A1* | 8/2012 | Sajid | G06F 1/1628 206/216 |
| 2013/0140203 A1* | 6/2013 | Chiang | G06F 1/1628 206/320 |
| 2013/0242490 A1 | 9/2013 | Ku | |
| 2014/0216954 A1* | 8/2014 | Law | A45F 5/02 206/45.23 |
| 2014/0291177 A1* | 10/2014 | Ko | G06F 1/1626 206/45.23 |
| 2014/0311927 A1 | 10/2014 | Kang | |
| 2015/0001105 A1* | 1/2015 | Nyholm | A45C 11/00 206/45.2 |
| 2015/0030310 A1* | 1/2015 | Nesbitt | H04N 21/4325 386/239 |
| 2015/0041341 A1* | 2/2015 | Marshall | A45C 11/00 206/45.2 |
| 2015/0335115 A1* | 11/2015 | Kim | A45C 11/00 224/191 |

* cited by examiner

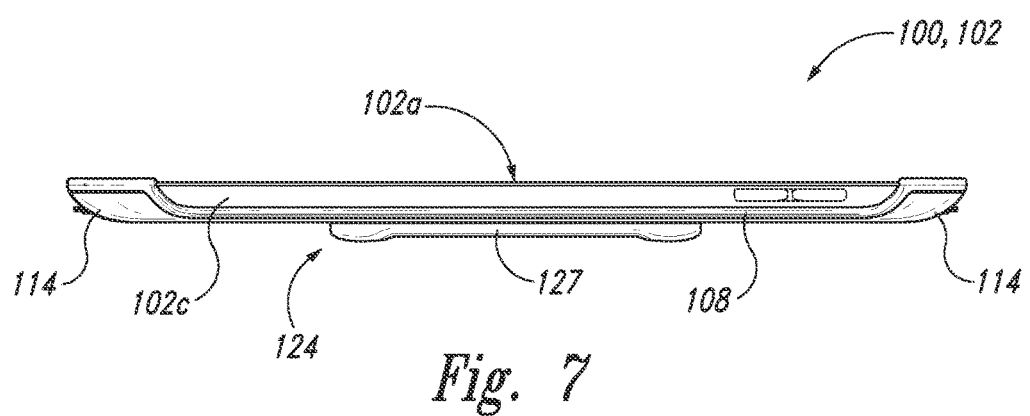
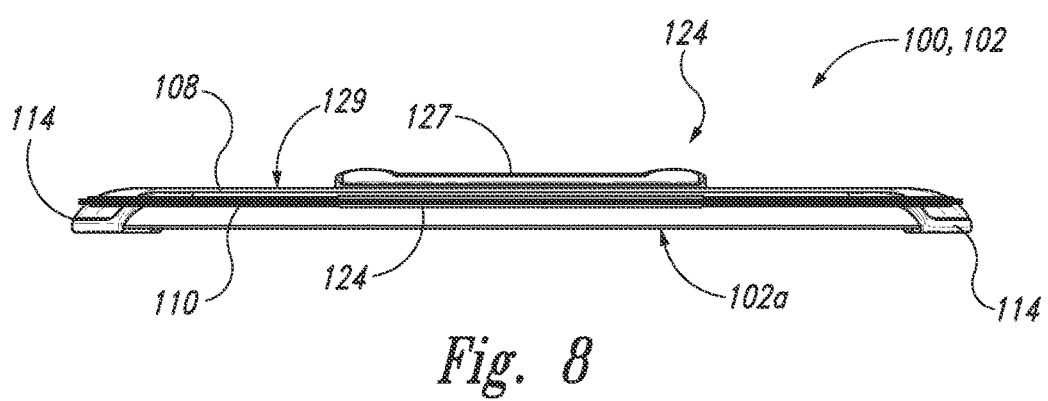

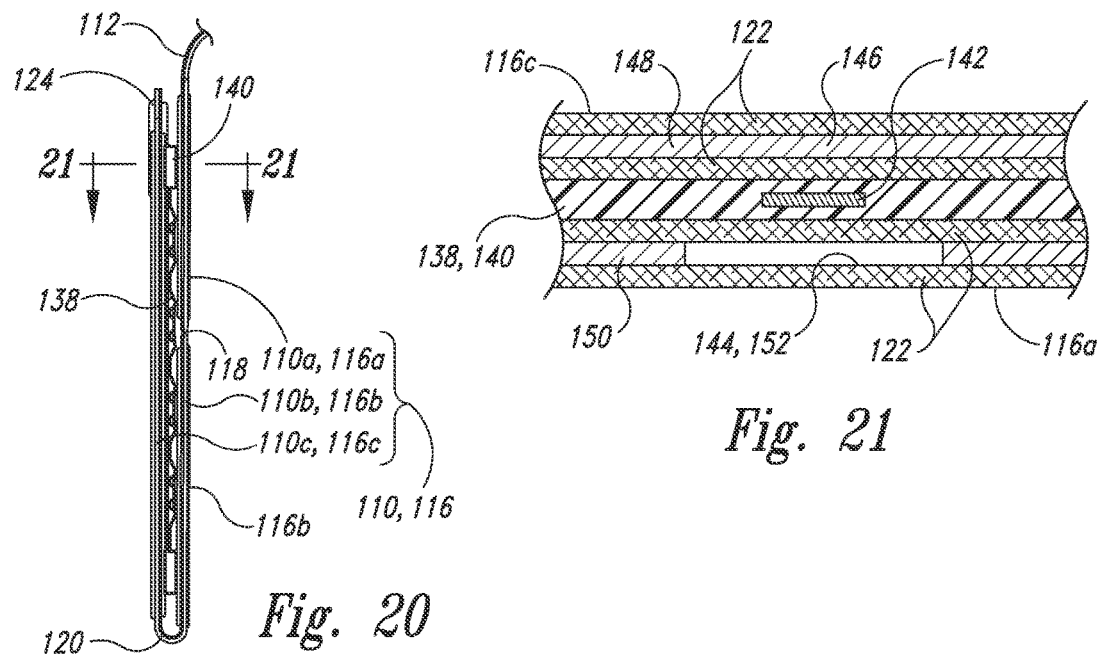
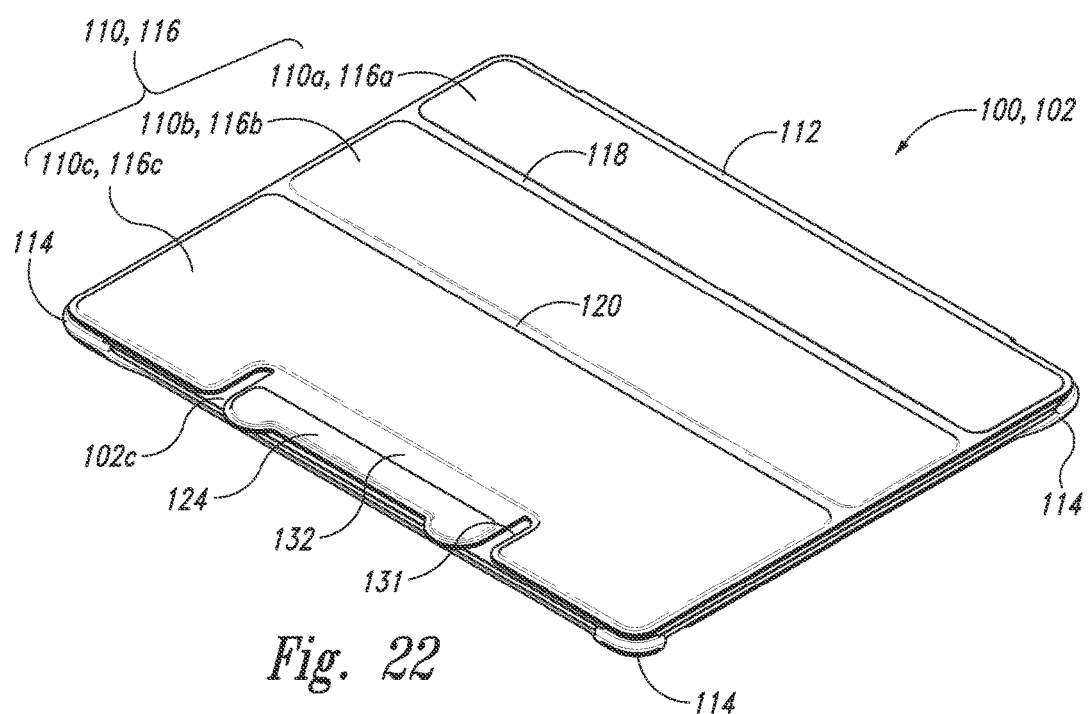

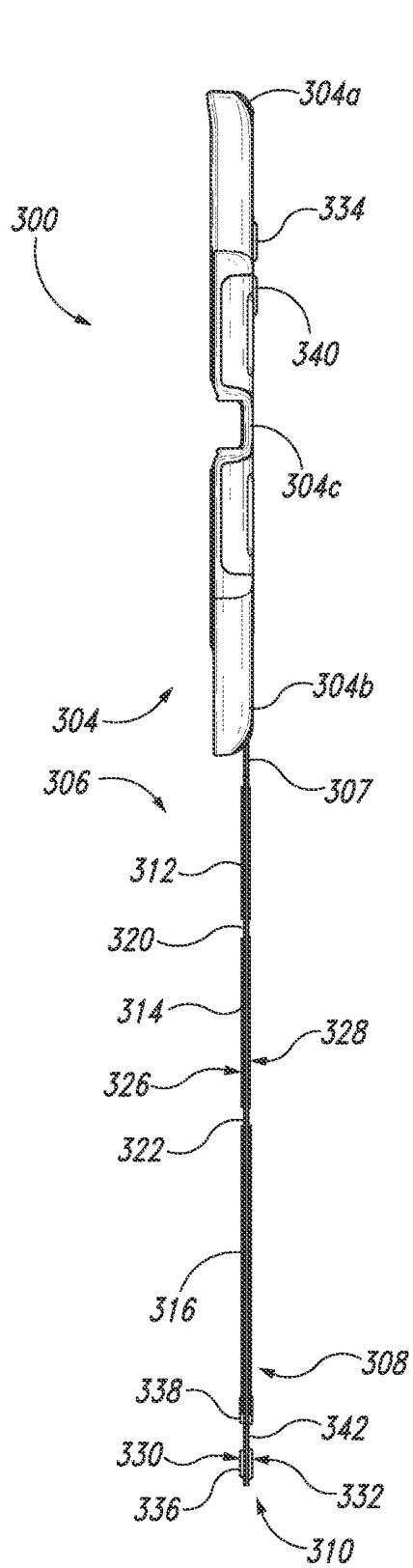
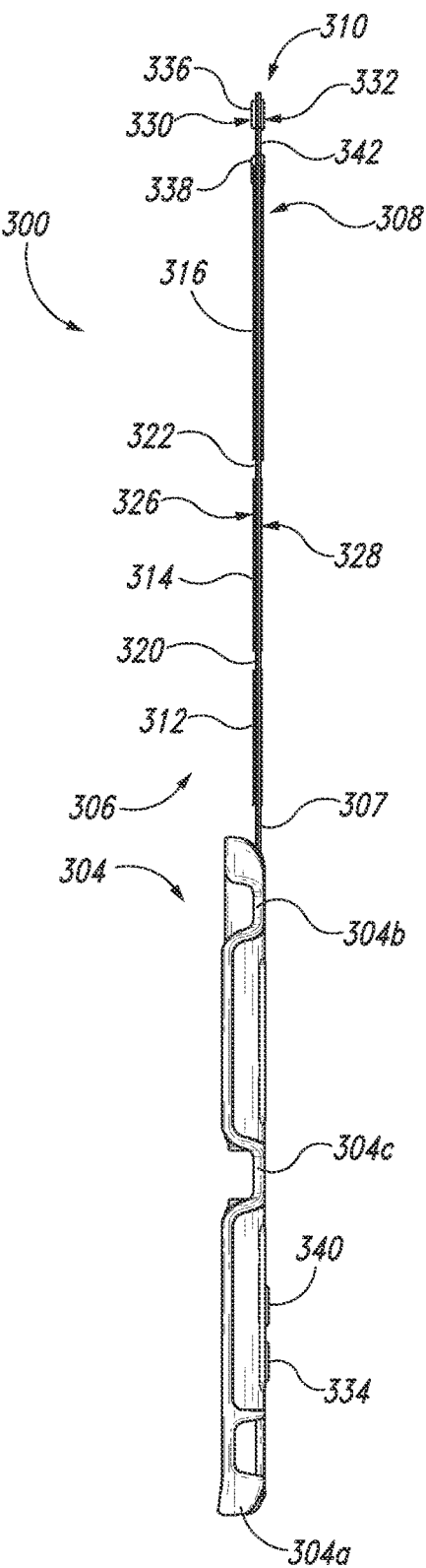
Fig. 38
Fig. 39

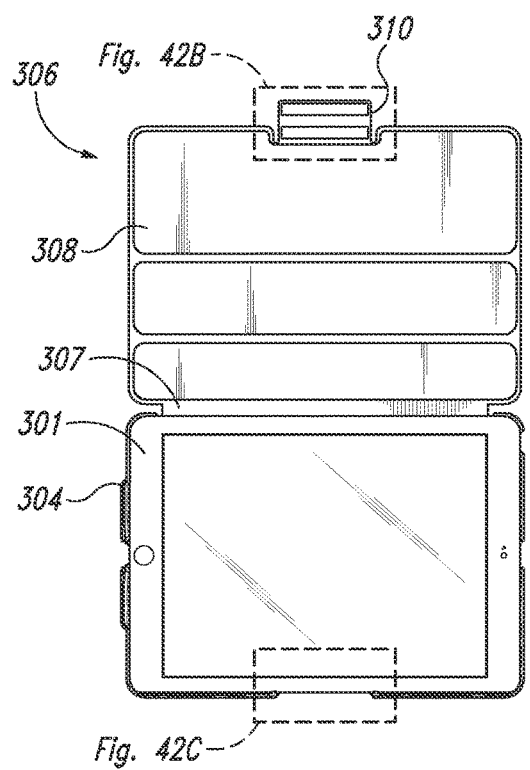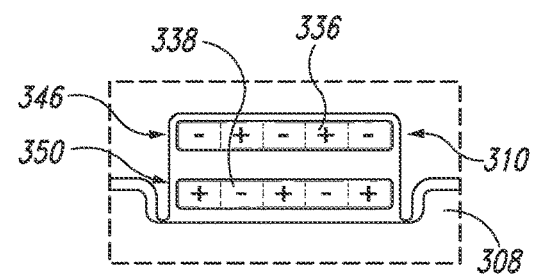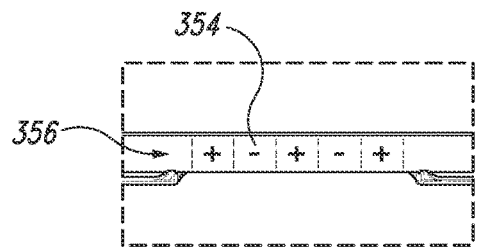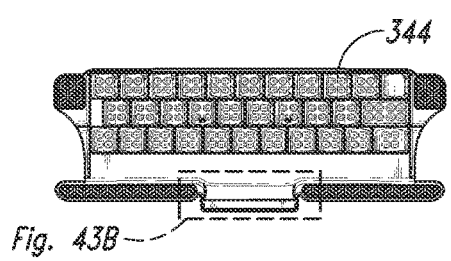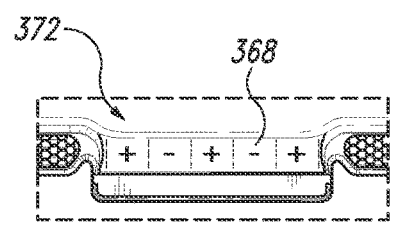
Fig. 42A
Fig. 42B
Fig. 42C
Fig. 43A
Fig. 43B

PROTECTIVE CASE INCLUDING COVER DEPLOYABLE AS AN ADJUSTABLE SUPPORT STRUCTURE AND RELATED DEVICES, SYSTEMS, AND METHODS

CROSS-REFERENCE TO RELATED APPLICATION INCORPORATED BY REFERENCE

This application is a continuation-in-part of U.S. application Ser. No. 14/149,799, filed Jan. 7, 2014, and claims the benefit of the earlier filing date of U.S. Provisional Application No. 62/009,835, filed Jun. 9, 2014. The foregoing applications are incorporated herein by reference in their entireties. To the extent the foregoing applications or any other material incorporated herein by reference conflicts with the present disclosure, the preset disclosure controls.

TECHNICAL FIELD

The present technology is related to protective cases and other accessories useable with personal electronic devices. In particular, at least some embodiments are related to protective cases respectively including covers deployable as adjustable support structures.

BACKGROUND

Many personal electronic devices (e.g., tablet computers, laptop computers, and mobile telephones) are relatively compact and streamlined in form. A typical example of such electronic devices is slab-shaped with expansive front and back surfaces and a relatively narrow edge extending between respective perimeters of the front and back surfaces. A touchscreen may occupy nearly all of the front surface. Although electronic devices of this form are often rectangular and flat with rounded or non-rounded corners, other shapes are also possible. In general, the form of these electronic devices may facilitate mobility, such as by allowing the electronic devices to be conveniently stowed in briefcases, purses, pockets, and other locations closely associated with a user. The same form, however, may also tend to exclude certain features that occupy space, such as features that serve protective and ergonomic functions. For example, many slab-shaped personal electronic devices lack even rudimentary features to protect the electronic devices from impact damage. As another example, these and other electronic devices may be designed to be used in different positions respectively corresponding to different viewing angles, but the electronic devices may include few, if any, features that allow the electronic devices to be self-supporting in these positions. Accessories, such as retrofitted aftermarket accessories, may be used to compensate for these and other deficiencies.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. For ease of reference, throughout this disclosure identical reference numbers may be used to identify identical or at least generally similar or analogous components or features.

FIGS. 3-8 are, respectively, an inverse plan view, a plan view, a first side profile view, a second side profile view, a first end profile view, and a second end profile view of the case and the electronic device shown in FIGS. 1 and 2.

FIG. 20 is a side profile view of a portion of the case shown in FIGS. 1 and 2 with the cover in the open configuration, the first and second coupling components detached from one another, the support structure in the subconfiguration shown in FIG. 17, and a keyboard overlay stowed within the support structure.

FIG. 21 is an enlarged cross-sectional view taken along the line 21-21 in FIG. 20.

FIG. 22 is a profile view of the case and the electronic device shown in FIGS. 1 and 2 with the cover in the closed configuration shown in FIG. 9.

FIGS. 36-41 are, respectively, a plan view, an inverse plan view, a first side profile view, a second side profile view, a first end profile view, and a second end profile view of the case shown in FIG. 33.

FIG. 42A is a plan view of the case and the electronic device shown in FIG. 33.

FIGS. 42B and 42C are enlargements of respective portions of FIG. 42A.

FIG. 43A is a plan view of a keyboard overlay that can be used with the case and the electronic device shown in FIG. 33 in a system configured in accordance with an embodiment of the present technology.

FIG. 43B is an enlargement of a portion of FIG. 43A.

In FIG. 49, the cover is shown in a closed configuration and the case is shown magnetically attached to a vertical metal surface.

In FIG. 50, the case is magnetically attached to the vertical metal surface and the cover and the keyboard overlay are stowed between the backing and the vertical metal surface.

DETAILED DESCRIPTION

The present technology is related to protective cases and other accessories useable with personal electronic devices, such as slab-shaped (e.g., tablet shaped) personal electronic devices. Examples of compatible electronic devices include tablet computers, e-book readers, laptop computers, and smartphones, among others. Protective cases configured in accordance with at least some embodiments of the present technology allow an encased electronic device to be conveniently positioned and repositioned in one of several self-supporting tilted positions well suited for viewing and operating the electronic device. In these and other embodiments, the cases may also protect an encased electronic device from impact damage. For example, a protective case configured in accordance with a particular embodiment includes a cover that, in a closed configuration, overlays a screen of an encased electronic device and, in an open configuration, forms a support structure capable of supporting the encased electronic device at two or more different tilted positions. Furthermore, these and other protective and ergonomic enhancements may be provided without unduly increasing the bulk of an encased electronic device or otherwise compromising a streamlined form of the electronic device. In contrast to conventional protective cases, protective cases configured in accordance with embodiments of the present technology can be more convenient, more versatile, more compact, and/or have other advantages.

Specific details of protective cases and related devices, systems, and methods in accordance with several embodiments of the present technology are described herein with reference to FIGS. 1-50. A person of ordinary skill in the art will understand that protective cases and related devices, systems, and methods configured in accordance with other embodiments of the present technology can have other configurations, components, and/or procedures in addition to or instead of those disclosed herein and that the described protective cases and related devices, systems, and methods can be without several of the configurations, components, and/or procedures disclosed herein without deviating from the present technology. As used herein, the terms "distal" and "proximal" define a position or direction with respect to a reference position. The terms "distal" and "distally" refer to a position distant from or in a direction away from a reference position. The terms "proximal" and "proximally" refer to a position near or in a direction toward a reference position. Unless the context clearly indicates otherwise, the reference position is a position of a joint between a backing and a cover of a protective case.

Figure 1:
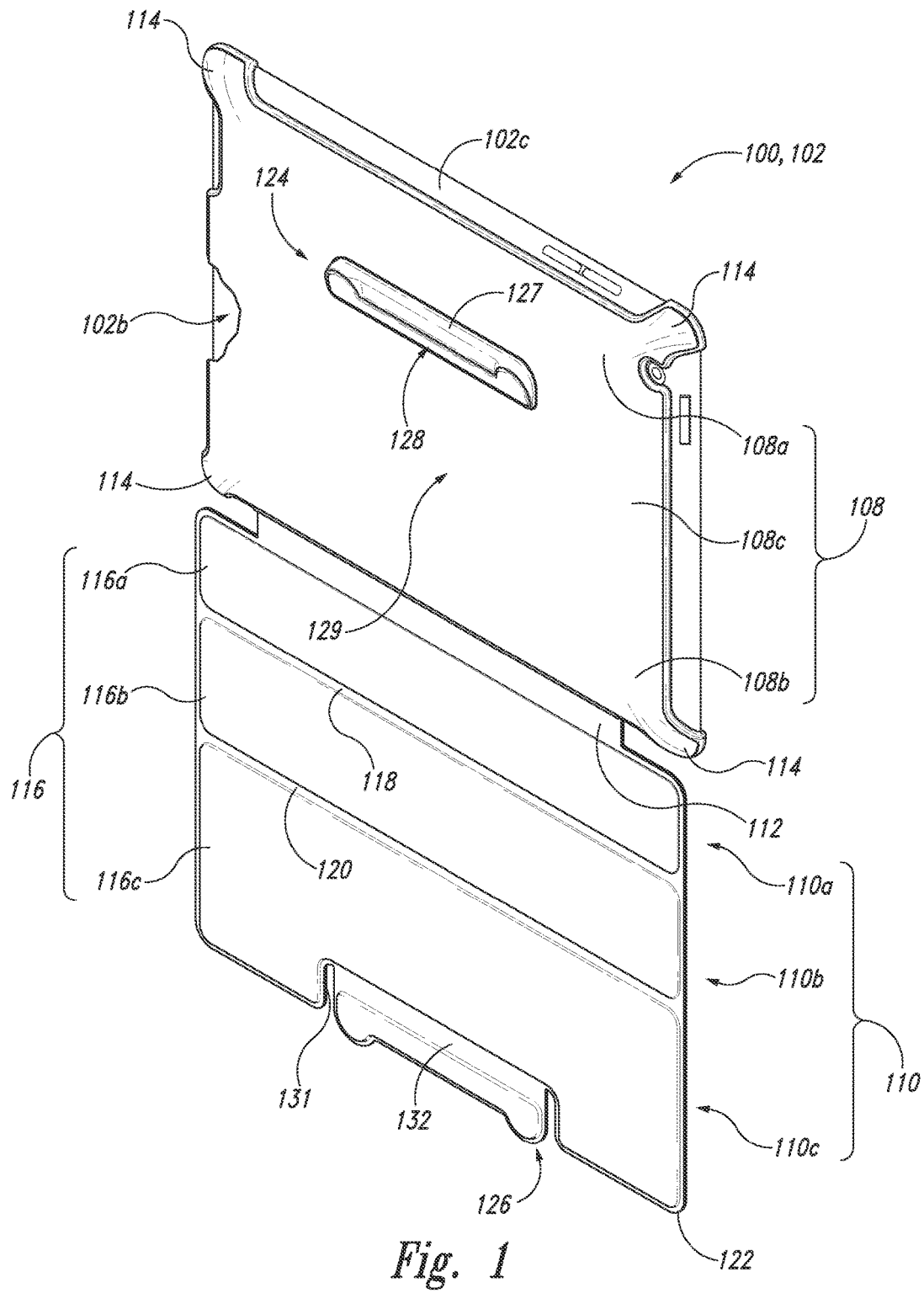
FIGS. 1 and 2 are, respectively, different perspective views of a protective case configured in accordance with an embodiment of the present technology and an associated electronic device. The case can include a backing, a cover, and a joint therebetween. The backing and the cover can include, respectively, a first coupling component and a second coupling component.
Figure 2:
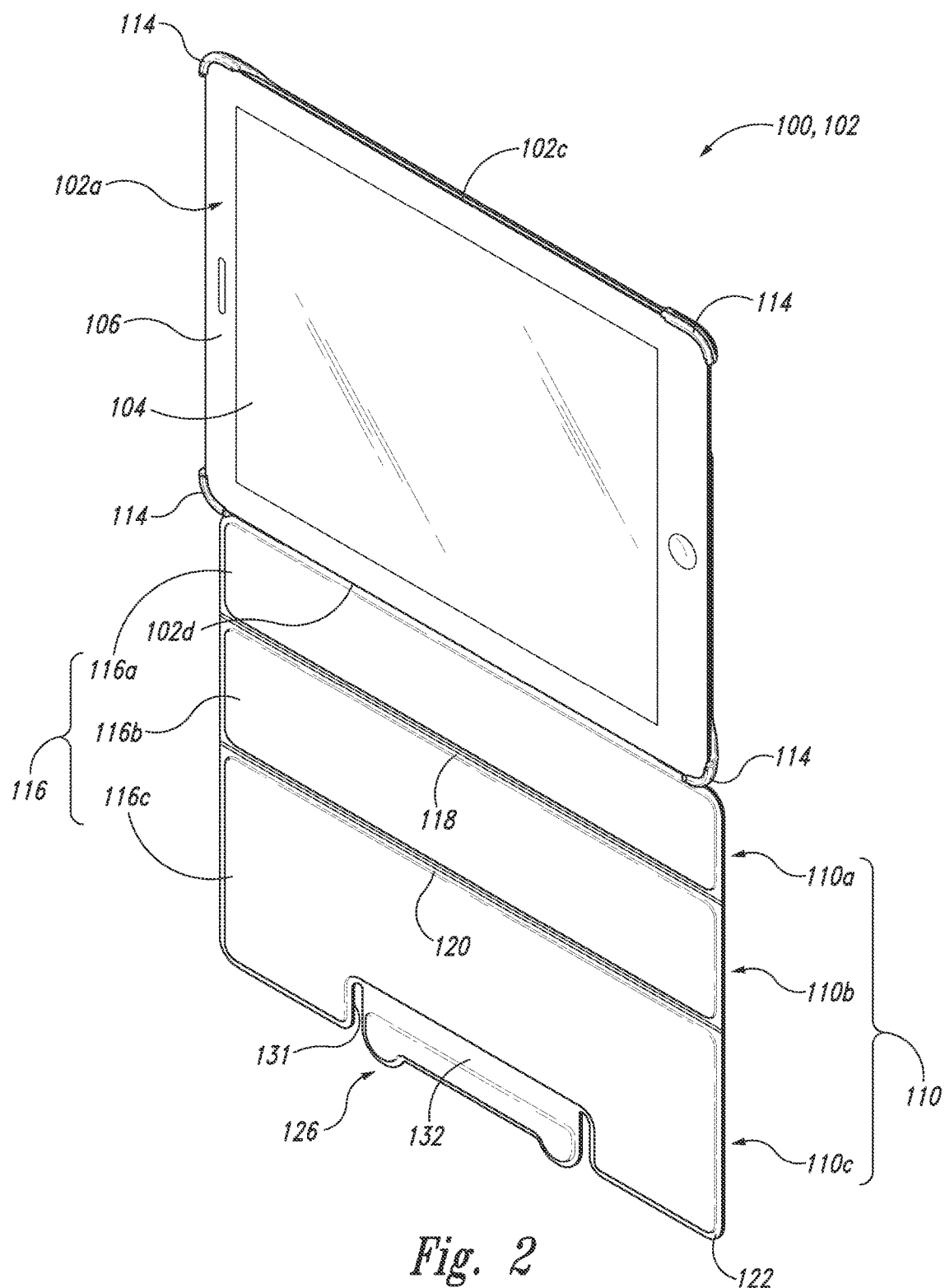
Figure 3:
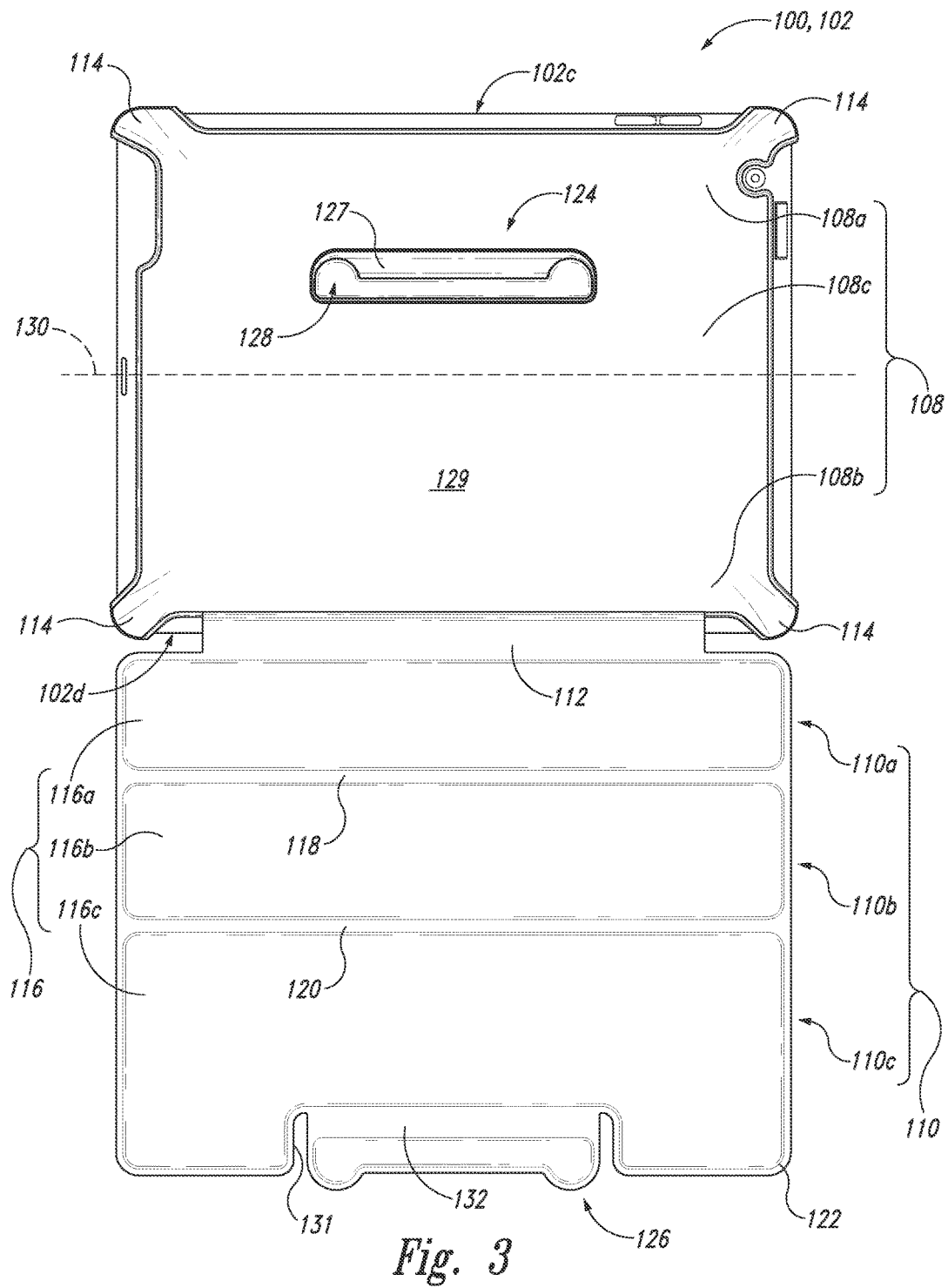
Figure 4:
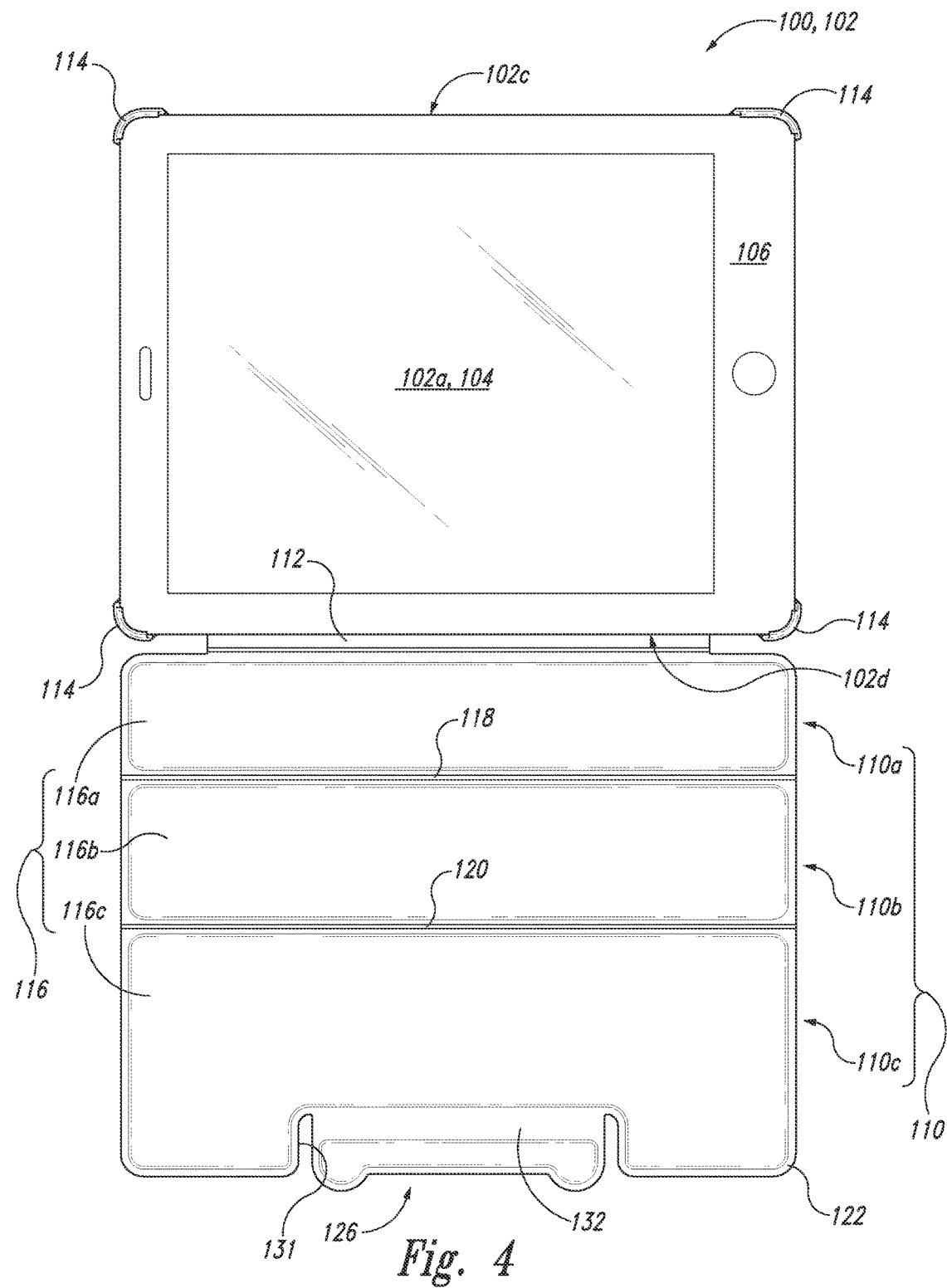
Figure 5:
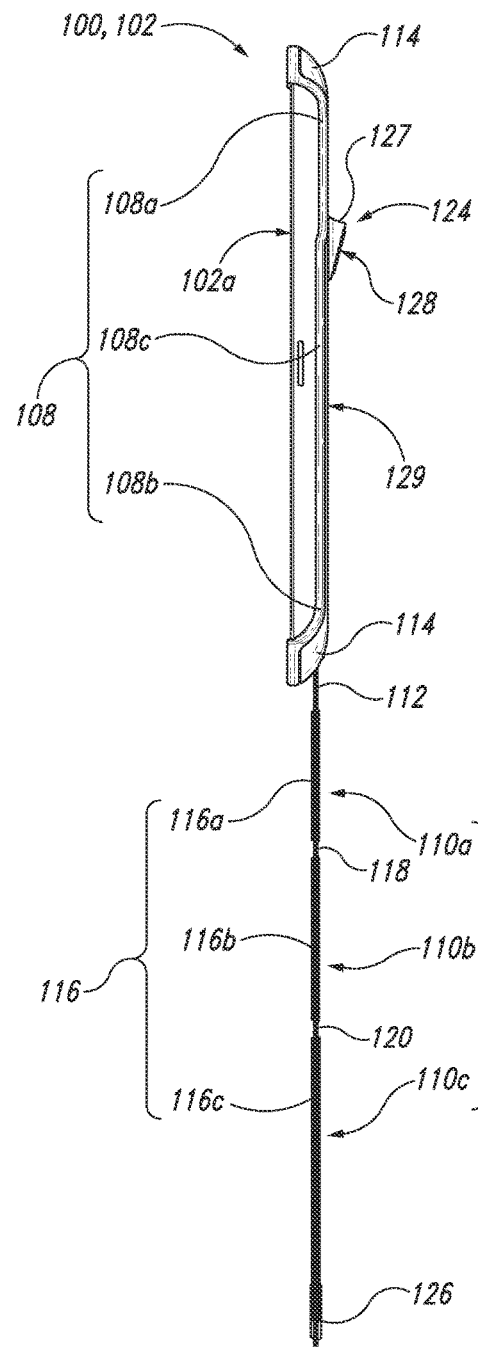
Figure 6:
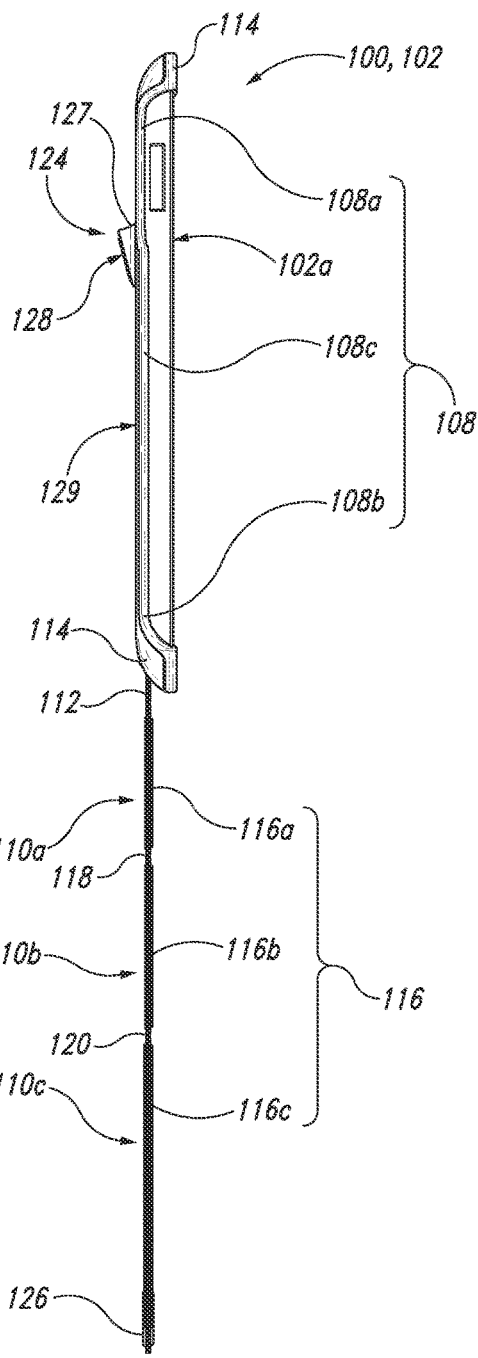

FIGS. 1 and 2 are, respectively, different perspective views of a protective case 100 configured in accordance with an embodiment of the present technology and an associated electronic device 102. FIGS. 3-8 are, respectively, an inverse plan view, a plan view, a first side profile view, a second side profile view, a first end profile view, and a second end profile view of the case 100 and the electronic device 102. With reference to FIGS. 1-8 together, the case 100 can include a backing 108, a cover 110, and a first joint 112 extending therebetween. The electronic device 102 can be slab-shaped with a front side 102a (FIG. 2), a back side 102b (FIG. 1) opposite to the front side 102a, a first edge 102c (e.g., a leading edge) (FIG. 1), and a second edge 102d (e.g., a trailing edge—FIG. 2) opposite to the first edge 102c. At its front side 102a, the electronic device 102 can include a screen 104 (FIG. 2) and a peripheral region 106 (FIG. 2) around a perimeter of the screen 104. The backing 108 can be shaped to securely attach to the back side 102b of the electronic device 102. Suitable materials for the backing 108 include plastics (e.g., injection-molded plastics), elastomers (e.g., low-, medium-, and high-durometer elastomers), sprung metal, cloth, elastomeric cloth, and combinations thereof.

The cover 110 can be configured to be moved into and out of a closed configuration in which the cover 110 is flush with or otherwise overlays the front side 102a of the electronic device 102. The first joint 112 can be configured to wrap around the second edge 102d of the electronic device 102. For example, the first joint 112 can be a floating hinge or another suitable type of joint capable of bending at two or more axes. In the illustrated embodiment, the first joint 112 is an elongate flexure bearing with sufficient width to extend over the second edge 102d of the electronic device 102 from a perimeter of the front side 102a of the electronic device 102 to a perimeter of the back side 102b of the electronic device 102. In other embodiments, the first joint 112 can have another suitable form. For example, the first joint 112 can include two or more barrel hinge elements (not shown), such as one barrel hinge element positioned to be proximate to the perimeter of the front side 102a of the electronic device 102 and a second barrel hinge element positioned to be proximate to the perimeter of the back side 102b of the electronic device 102.

With reference again to FIGS. 1-8, the backing 108 can include an elongate first end portion 108a (e.g., a leading end portion), an elongate second end portion 108b (e.g., a trailing end portion) parallel to the first end portion 108a, and a planar central portion 108c extending therebetween. The first end portion 108a of the backing 108 can be configured to secure at least a portion of the first edge 102c of the electronic device 102. Similarly, the second end portion 108b of the backing 108 can be configured to secure at least a portion of an opposite second edge 102d of the electronic device 102. In the illustrated embodiment, the backing 108 includes four corner crooks 114 respectively positioned to engage (e.g., to cradle or otherwise conformationally constrain) four corners of the electronic device 102. The first joint 112 can be coupled to the second end portion 108b of the backing 108 between two of the corner crooks 114. Alternatively or in addition, the case 100 can include other structures to prevent the electronic device 102 from sliding out of the backing 108. For example, resilient clips (not shown) or continuous grooves (also not shown) can be used in addition to or instead of the corner crooks 114. As another example, the case 100 can include a hook-and-loop fastener (not shown) or another suitable fastener positioned between an inwardly facing surface of the backing 108 and the back side 102b of the electronic device 102.

The cover 110 can be articulated to allow the cover 110 to be deployed as a support structure (e.g., a three-dimensional support structure) when not being used to protect the front side 102a of the electronic device 102. For example, the cover 110 can include a proximal panel 116a, an intermediate panel 116b, and a distal panel 116c (referenced collectively as "panels 116" or individually as "individual panels 116") respectively disposed at a proximal portion 110a, an intermediate portion 110b, and a distal portion 110c of the cover 110. The individual panels 116 can be elongate and parallel to one another. Suitable materials for the panels 116 include rigid and semi-rigid materials, such as structural metals, plastics, and composites. The cover 110 can also include a second joint 118 operably positioned between the proximal and intermediate panels 116a, 116b. Similarly, the cover 110 can include a third joint 120 operably positioned between the intermediate and distal panels 116b, 116c. As with the first joint 112, the second joint 118 and/or the third joint 120 can be flexure bearings or include barrel hinge elements or have other suitable forms. For example, the cover 110 can include a flexible webbing 122, the panels 116 can include respective plates (not shown) sandwiched between layers of the webbing 122, and the second and third joints 118, 120, respectively, can be unsupported portions of the webbing 122 between the panels 116.

The backing 108 and the cover 110 can include, respectively, a first coupling component 124 and a second coupling component 126 releasably securable to one another. The first and second coupling components 124, 126 can be elongate and parallel to one another. The first coupling component 124 can include a wedge-shaped bearing 127 and a bearing surface 128 and can be disposed on an outwardly facing surface 129 of the central portion 108c of the backing 108. The bearing surface 128 can angle away from the surface 129 of the central portion 108c of the backing 108 such that a proximal end of the bearing surface 128 is closer to the surface 129 than is a distal end of the bearing surface 128. In at least some embodiments, the first coupling component 124 is spaced apart from the first and second end portions 108a, 108b of the backing 108. Furthermore, the first coupling component 124 can be positioned closer to the first end portion 108a of the backing 108 than to the second end portion 108b of the backing 108. For example, the first coupling component 124 can be centrally positioned between the first end portion 108a of the backing 108 and an axis 130 (FIG. 2) parallel to the first and second end portions 108a, 108b of the backing 108 that bisects the central portion 108c of the backing 108. The second coupling component 126 can extend distally from the distal panel 116c. For example, the distal panel 116c can include a distally oriented inset 131, and the second coupling component 126 can be a tab positioned at least partially within the inset 131. In some embodiments, the second coupling component 126 includes flaps (not shown) that restrict bending of the second coupling component 126 to one side of the cover 110, such as by overlapping the distal panel 116c at one or both sides of the inset 131. In other embodiments, the second coupling component 126 can be without such features.

The second coupling component 126 can be hingedly connected to the distal panel 116c. For example, the cover 110 can include a fourth joint 132 operably positioned between the distal panel 116c and the second coupling component 126. In the illustrated embodiment, the first coupling component 124 is fixedly connected to the backing 108. In other embodiments, the first coupling component 124 can be hingedly connected to the backing 108 in addition to or instead of the second coupling component 126 being hingedly connected to the distal panel 116c. In still other embodiments, the first and second coupling components 124, 126 can be fixedly connected, respectively, to the backing 108 and to the distal panel 116c. When hingedly connected, respectively, to the backing 108 and to the distal panel 116c, the first and second coupling components 124, 126 can be configured to bend along one or more axes. For example, as with the cover 110, the first and second coupling components 124, 126 can be articulated.

With reference again to FIGS. 1-8, the first and second coupling components 124, 126 can be configured to be magnetically attached to one another. For example, the first and second coupling components 124, 126 can respectively include magnets (e.g., rare-earth magnets) that form a stable connection when the first and second coupling components 124, 126 are squarely attached to one another. This connection mechanism can facilitate blind coupling of the first and second coupling components 124, 126. For example, a user positioned at the front side 102a of the electronic device 102 may be able to open the cover 110 and couple the first and second coupling components 124, 126 to one another by touch without having to view the back side 102b of the electronic device 102. This operation can include sliding a distal edge of the distal panel 116c along the backing 108 from the first end portion 108a of the backing 108 toward the second end portion 108b of the backing 108. When the first and second coupling components 124, 126 move into close proximity, magnetic attraction can cause the first and second coupling components 124, 126 to squarely attach to one another.

The respective north-south orientations of magnets within the first and second coupling components 124, 126 can be selected to provide a strong attraction between the first and second coupling components 124, 126 that resists separation of the first and second coupling components 124, 126. When the first and second coupling components 124, 126 are attached to one another, the second coupling component 126 can be in face-to-face contact with the bearing surface 128. The respective orientations of magnets within the first and second coupling components 124, 126 can be perpendicular to the bearing surface 128 and to a corresponding face of the second coupling component 126. This can be useful to provide a strong magnetic attraction between the first and second coupling components 124, 126 that resists separation of the first and second coupling components 124, 126 in response to uniaxial normal stress. In addition or alternatively, magnets within the first and second coupling components 124, 126 can have respective orientations at one or more angles less than 90 degrees relative to the bearing surface 128 and to the corresponding face of the second coupling component 126. This can be useful to provide a strong magnetic attraction between the first and second coupling components 124, 126 that resists separation of the first and second coupling components 124, 126 in response to shear stress. The angle of the bearing surface 128 can be selected to cause the a connection between the first and second coupling components 124, 126 to resist separation of the first and second coupling components 124, 126 in response to force associated with using the electronic device 102, such as downward force that results from keystrokes on the screen 104. In at least some embodiments, the bearing 127 causes the bearing surface 128 to be more perpendicular to the direction of this force than it would be if the bearing surface 128 were parallel to the surface 129 of the central portion 108c of the backing 108. In this way, the bearing 127 can provide for a stable connection between the first and second coupling components 124, 126 when the cover 110 is in the open configuration.

Many alternatives to magnetic coupling of the first and second coupling components 124, 126 are possible. For example, the first and second coupling components 124, 126 can include respective halves of a releasable non-magnetic mechanical coupler (not shown). Examples of such couplers include snaps, hook-and-loop tape, and buckles (e.g., side-release buckles and cam-lock buckles), among others. Furthermore, the first and second coupling components 124, 126 can include respective halves of both magnetic and non-magnetic couplers, such as a magnetic coupler to facilitate blind alignment of the first and second coupling components 124, 126 and a non-magnetic coupler to facilitate releasable locking of the first and second coupling components 124, 126 to one another. When the first and second coupling components 124, 126 are magnetic and individually include multiple magnets, the magnets can be arranged with alternating polarities to further facilitate alignment of the first and second coupling components 124, 126. As another yet variation, one or both of the first and second coupling components 124, 126 can have an adjustable position. For example, the first coupling component 124 can be positioned on a retractable tongue (not shown) that can be adjusted and locked at different extensions to cause the first coupling component 124 to have different positions relative to the backing 108. Such a tongue can be locked, for example, between jaws of a clamping mechanism (not shown).

Figure 9:
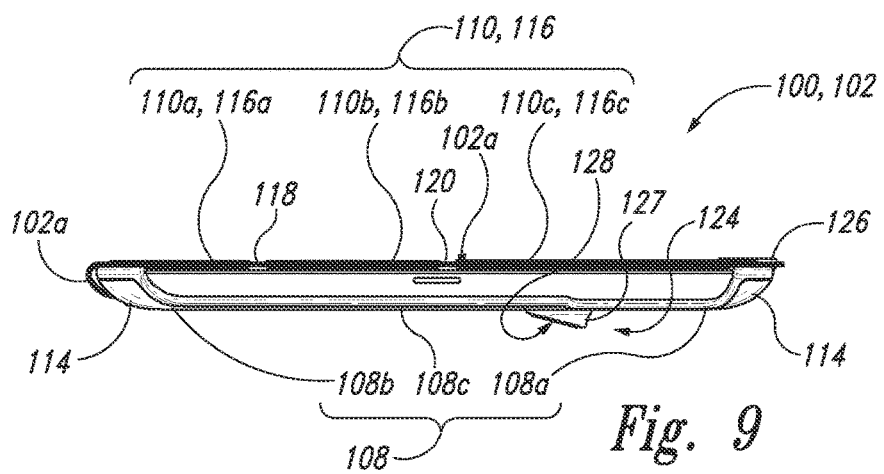
FIG. 9 is a side profile view of the case and the electronic device shown in FIGS. 1 and 2 with the cover in a closed configuration in which panels of the cover overlay a front side of the electronic device.

FIG. 9 is a side profile view of the case 100 and the electronic device 102 with the cover 110 in a closed configuration in which the panels 116 are disposed in a planar arrangement overlaying the front side 102a of the electronic device 102. In this configuration, the cover 110 can protect the screen 104 from damage. The cover 110 can be held in this position magnetically, mechanically, or in another suitable manner. In some embodiments, the electronic device 102 includes a peripheral magnet (not shown) embedded within the peripheral region 106 and a portion of the cover 110 overlaying the peripheral magnet when the cover 110 is in the closed configuration is made of ferrous metal. For example, all or a portion of the distal panel 116c can be made of ferrous metal and the distal panel 116c can overlay the peripheral magnet when the cover 110 is in the closed configuration. In addition or alternatively, the distal panel 116c or another suitable portion of the cover 110 can include another magnet (not shown) that overlays the peripheral magnet when the cover 110 is in the closed configuration. The attraction between the magnet of the cover 110 and the peripheral magnet of the electronic device 102 can help to align the cover 110 in a predetermined position when the cover 110 is in the closed configuration.

The cover 110 can be movable between the closed configuration and an open configuration by bending the first joint 112. FIGS. 10-13 are side profile views of the case 100 and the electronic device 102 with the cover 110 in the open configuration in which the panels 116 form a support structure 134 and the first and second coupling components 124, 126 are attached to one another. The support structure 134 can support the electronic device 102 at an angle relative to a horizontal support surface 136. Furthermore, the support structure 134 can be adjustable to change the angle without detaching the first and second coupling components 124, 126 from one another. For example, the support structure 134 is shown in FIGS. 10-13 in four different respective subconfigurations to support the electronic device 102 at four different respective angles relative to the support surface 136. When the cover 110 is in the open configuration, the panels 116 and the backing 108 can collectively form at least a portion of a perimeter of a closed loop.

Figure 10:
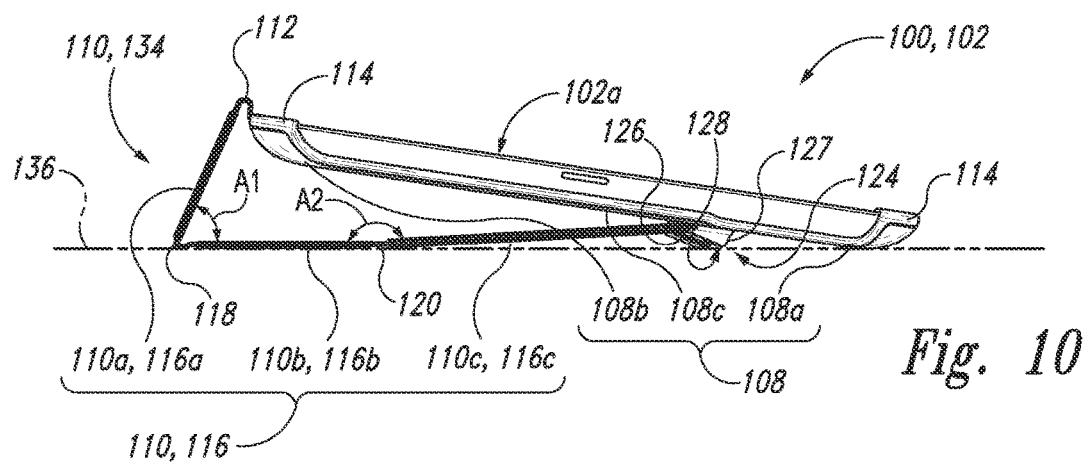
FIGS. 10-13 are side profile views of the case and the electronic device shown in FIGS. 1 and 2 with the cover in an open configuration in which the panels form a support structure and the first and second coupling components are attached to one another. The support structure is shown in FIGS. 10-13 in four different respective subconfigurations to support the electronic device at four different respective angles relative to a horizontal support surface.
Figure 11:
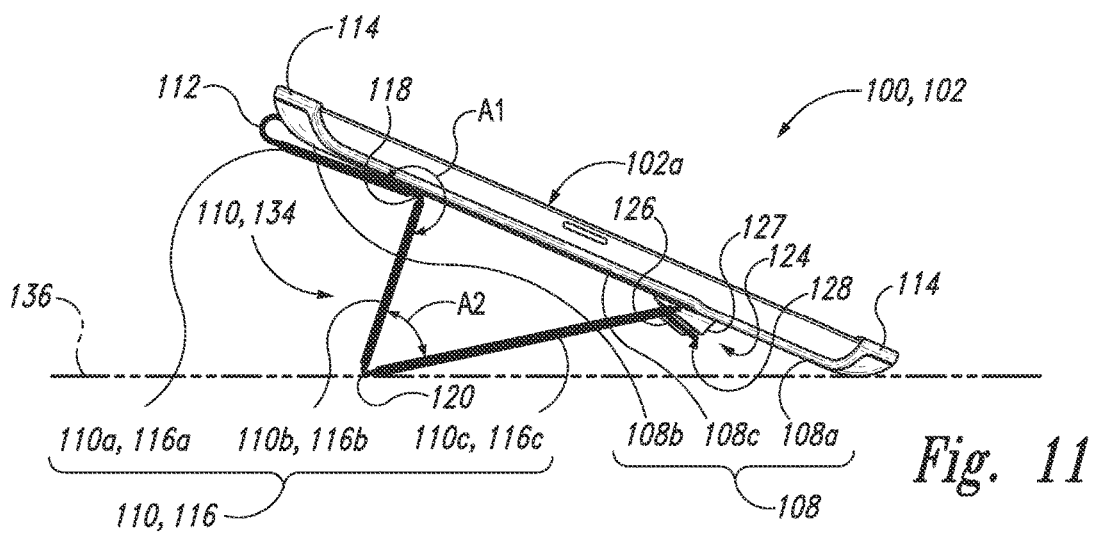
Figure 12:
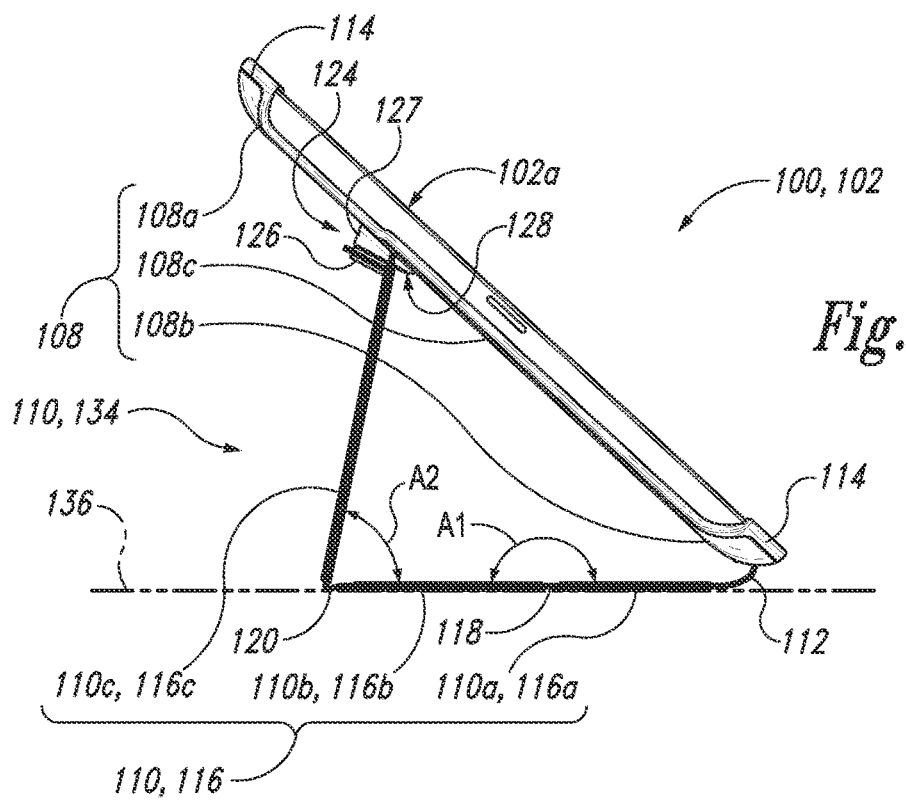

As shown in FIGS. 10-13, the closed loop can include a first interior angle A1 between the proximal and intermediate panels 116a, 116b and a second interior angle A2 between the intermediate and distal panels 116b, 116c. The support structure 134 can be adjustable to change the angle of the electronic device 102 by either adjusting the second joint 118 to increase the first interior angle A1 and adjusting the third joint 120 to decrease the second interior angle A2 or by adjusting the second joint 118 to decrease the first interior angle A1 and adjusting the third joint 120 to increase the second interior angle A2. Adjusting the support structure 134 from the subconfiguration shown in FIG. 10 to the subconfiguration shown in FIG. 11 and adjusting the support structure 134 from the subconfiguration shown in FIG. 13 to the subconfiguration shown in FIG. 12 are examples of the former. The opposite adjustments are examples of the latter. These adjustments can be relatively intuitive and convenient for a user.

When the cover 110 is manipulated to change the subconfiguration of the support structure 134, the first and fourth joints 112, 132 can bend as needed. In this way, the first and fourth joints 112, 132 can allow a portion of the backing 108 between the first coupling component 124 and the first joint 112 to act as another articulated panel within the closed loop. The respective placements of the first and second coupling components 124, 126 and the respective widths of the individual panels 116 perpendicular to the long axis of the first joint 112 can be selected to control the angles at which the electronic device 102 is self-supporting when the cover 110 is in the open configuration and the first and second coupling components 124, 126 are attached to one another. For example, the intermediate panel 116b can be more narrow than the distal panel 116c and the proximal panel 116a can be more narrow than the intermediate panel 116b and more narrow than the distal panel 116c. In at least some embodiments, the combined width of the proximal and intermediate panels 116a, 116b is from 95% to 120% of the width of the distal panel 116c. The respective stiffness of the first, second, third, and fourth joints 112, 118, 120, 132 can be selected to facilitate transitioning between the subconfigurations shown in FIGS. 10-13. For example, one or more of the first, second, third, and fourth joints 112, 118, 120, 132 can scored, thinned, or otherwise configured to have a preferential bending axis. As with the first joint, 112, the second, third, and fourth joints 118, 120, 132 individually can be configured to bend at one axis or at more than one axis.

Figure 13:
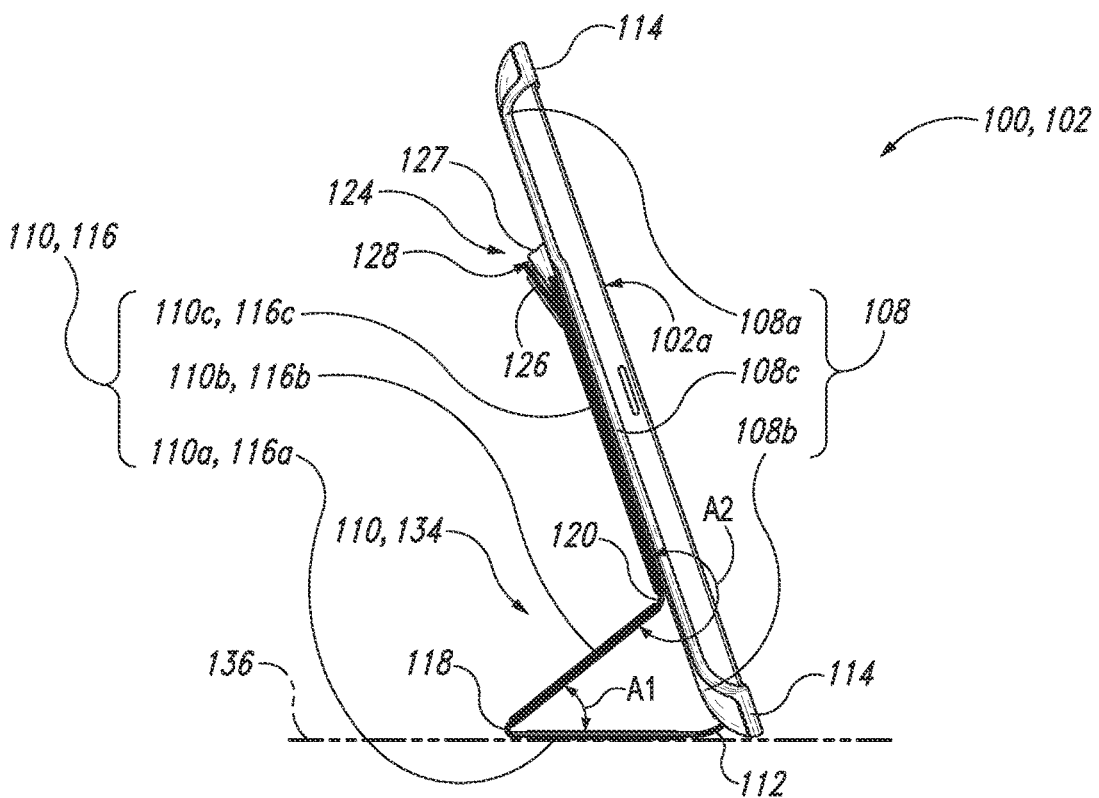
Figure 14:
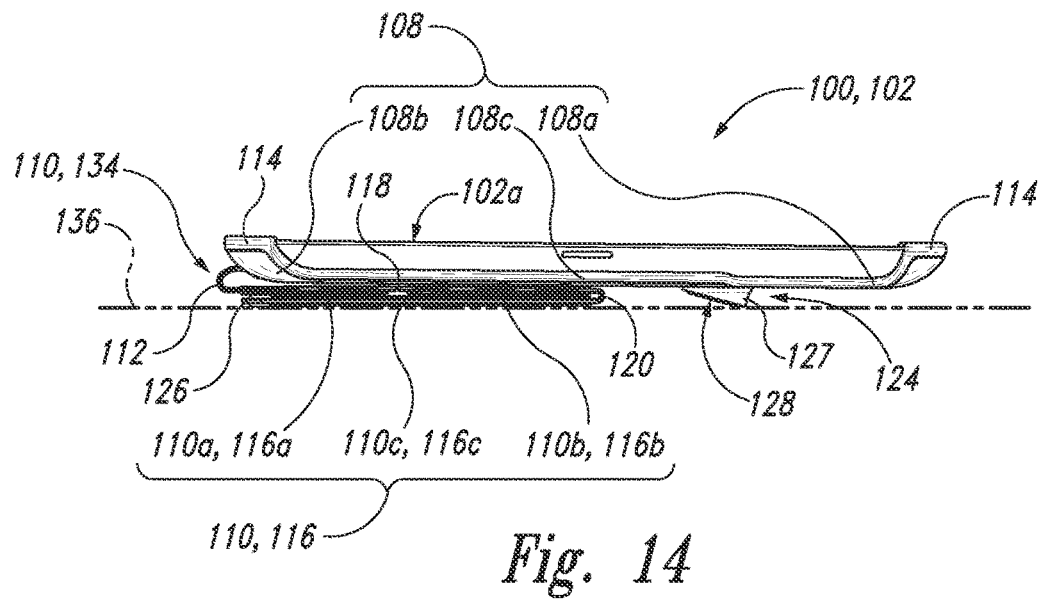
FIGS. 14-19 are side profile views of the case and the electronic device shown in FIGS. 1 and 2 with the cover in the open configuration and the first and second coupling components detached from one another. The support structure is shown in FIGS. 14-19 in six different respective subconfigurations to support the electronic device at six different respective angles relative to the support surface.
Figure 15:
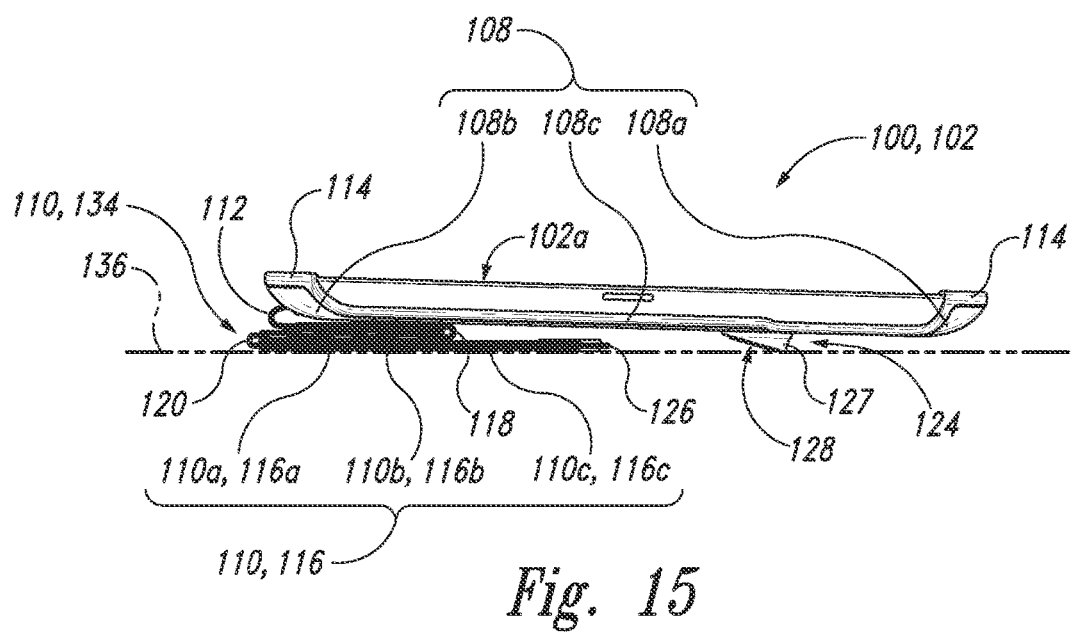
Figure 16:
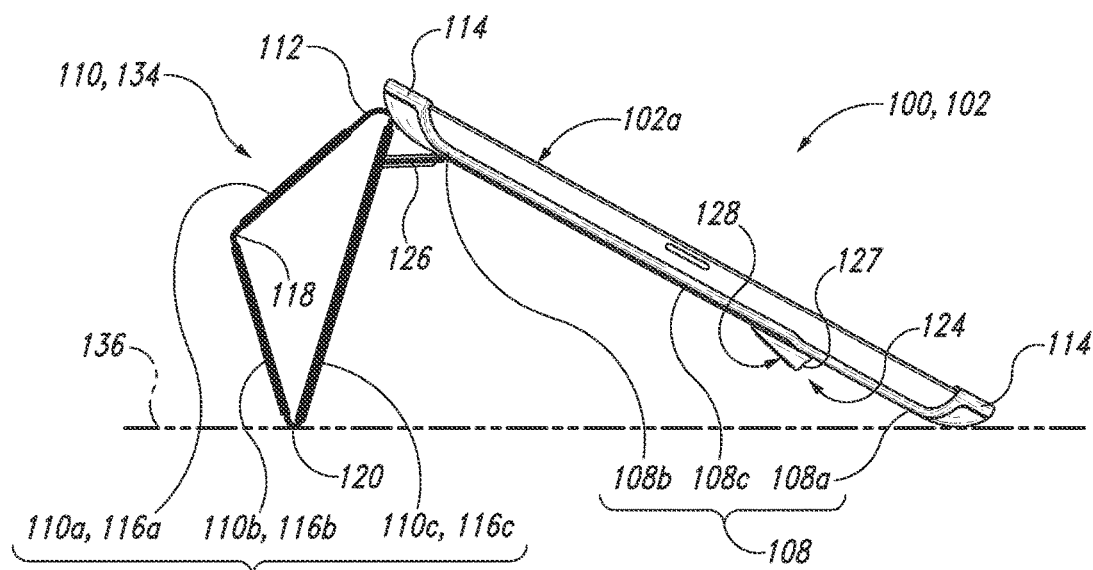

As shown in FIGS. 10 and 11 relative to FIGS. 12 and 13, the angles at which the electronic device 102 is self-supporting can be different depending on the orientation of the electronic device 102. The electronic device 102 can include a sensor (not shown) that automatically reorients the screen 104 depending on the orientation of the electronic device 102. Thus, adjustment of the support structure 134 and reorientation of the electronic device 102 can be used together to cause the electronic device 102 to be self-supporting at four different angles. Although the cover 110 in the illustrated embodiment includes three panels 116, in other embodiments, the cover 110 can include a greater number of panels 116, which may allow the electronic device 102 to be self-supporting at an even greater number of angles. Furthermore, when the cover 110 is in the open configuration, the first and second coupling components 124, 126 can be detached from one another to allow for adjustment of the angle at which the electronic device 102 is self-supporting. FIGS. 14-19 are side profile views of the case 100 and the electronic device 102 with the cover 110 in the open configuration and the first and second coupling components 124, 126 detached from one another. The support structure 134 is shown in FIGS. 14-19 in six different respective subconfigurations to support the electronic device 102 at six different respective angles relative to the support surface 136. In the subconfigurations shown in FIGS. 14 and 17, the first coupling component 124 can be magnetically coupled to the distal panel 116c. In the subconfiguration shown in FIG. 18, the position at which the distal edge of the distal panel 116c contacts the central portion 108c of the backing 108 can be varied to change the angle of the electronic device 102. Similarly, in the subconfiguration shown in FIG. 19, the position at which the third joint 120 contacts the central portion 108c of the backing 108 can be varied to change the angle of the electronic device 102.

Figure 17:
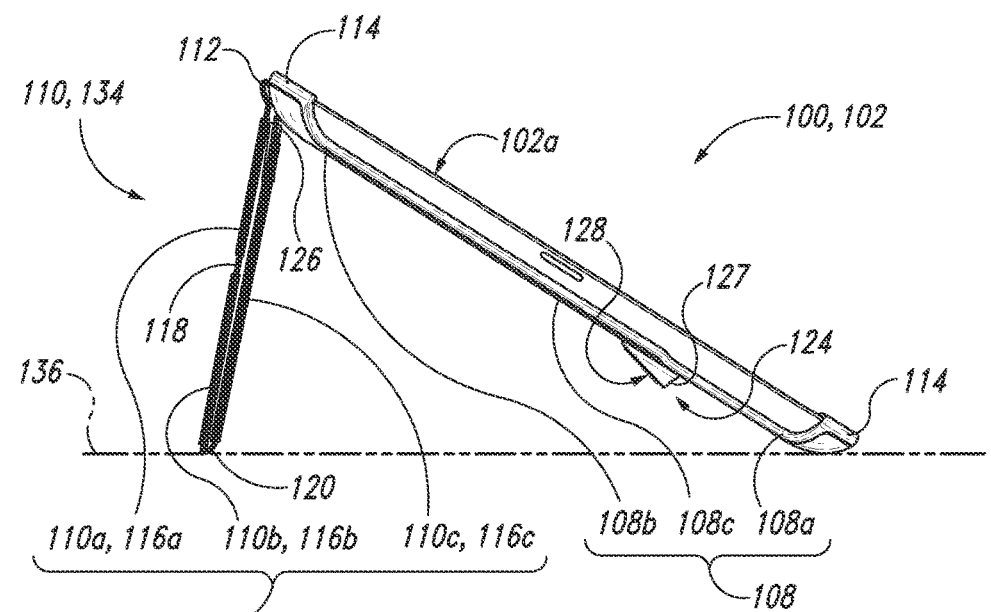
Figure 18:
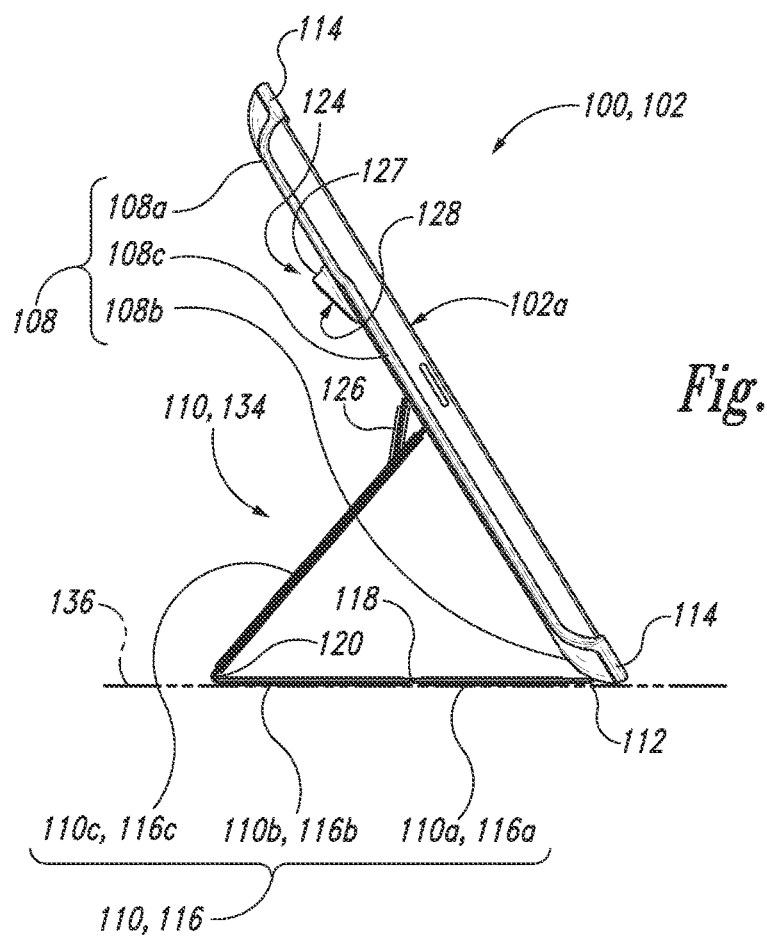
Figure 19:
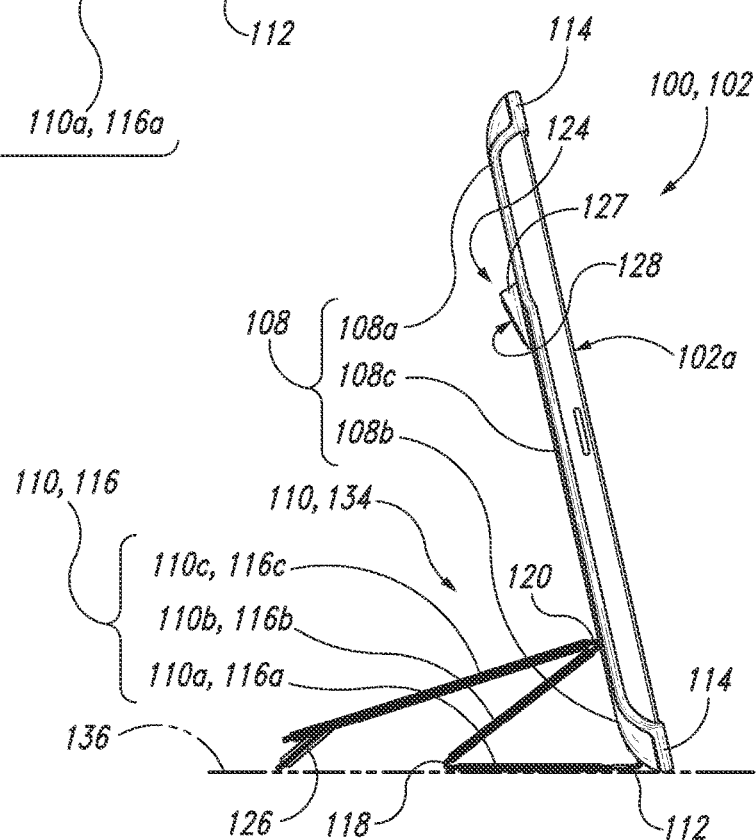

FIG. 20 is a side profile view of a portion of the case 100 with the cover 110 in the open configuration, the first and second coupling components 124, 126 detached from one another, and the support structure 134 in the subconfiguration shown in FIG. 17. In this subconfiguration, a keyboard overlay 138 can be conveniently stowed within the support structure 134. The keyboard overlay 138 can be a suitable keyboard overlay described in U.S. Pat. No. 8,206,047, which is incorporated herein by reference in its entirety. The keyboard overlay 138 can be configured to be magnetically coupled to the front side 102a of the electronic device 102 in an operable position at which the keyboard overlay 138 is usable in conjunction with a virtual keyboard (not shown) displayed on the screen 104. As shown in FIG. 20, when stowed, the keyboard overlay 138 can be interposed between the proximal and distal panels 116a, 116c and flush with the distal panel 116c. The widths of one or more of the individual panels 116 can be selected to facilitate this arrangement. In at least some embodiments, moving the cover 110 from the open configuration to the closed configuration automatically deploys the keyboard overlay 138 into its operable position at the front side 102a of the electronic device 102.

FIG. 21 is an enlarged cross-sectional view taken along the line 21-21 in FIG. 20. As shown in FIG. 21, the keyboard overlay 138 can include a magnetic coupler 140 including a magnetically active portion 142. The magnetically active portion 142 can be positioned to be aligned with a peripheral magnet within the peripheral region 106 at the front side 102a of the electronic device 102 when the keyboard overlay 138 is in its operable position. When the keyboard overlay 138 is stowed, it can be interposed between the proximal and distal panels 116a, 116c such that the magnetically active portion 142 of the magnetic coupler 140 is positioned between a first region 144 of the proximal panel 116a and an opposing second region 146 of the distal panel 116c. The second region 146 of the distal panel 116c can be configured to form a stronger magnetic bond with the magnetically active portion 142 of the magnetic coupler 140 than does the first region 144 of the proximal panel 116a. In the illustrated embodiment, the distal panel 116c includes a distal plate 148 made at least predominantly of ferrous metal that extends through the second region 146. In contrast, the proximal panel 116a can include a proximal plate 150 made at least predominantly of ferrous metal that includes a cut-away 152 at the first region 144. This can cause the keyboard overlay 138 to tend to travel with the distal panel 116c rather than with the proximal panel 116a when the cover 110 is moved from the open configuration to the closed configuration. In another embodiment, the distal plate 148 is made at least predominantly of ferrous metal and the proximal plate 150 is made at least predominantly of a non-magnetic material, such as fiberglass. In yet another embodiment, the distal and proximal plates 148, 150 are made at least predominantly of a non-magnetic material and the distal plate 148 includes a magnet (not shown) positioned to form a magnetic bond with the magnetically active portion 142 of the magnetic coupler 140 when the keyboard overlay 138 is stowed.

Figure 23:
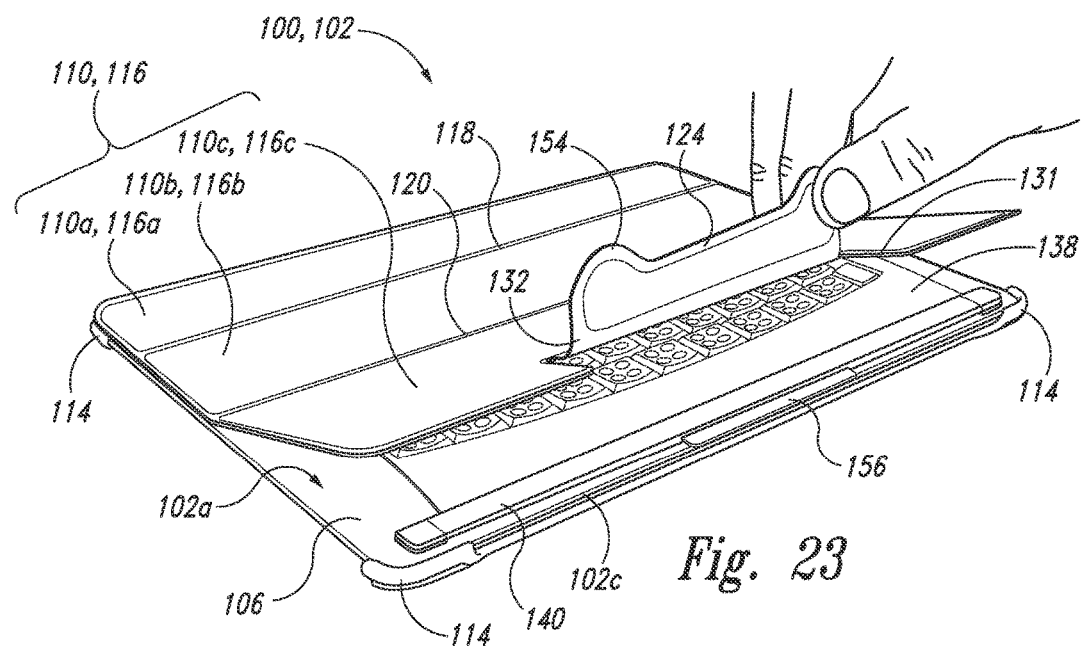
FIG. 23 is a perspective view of the case and the electronic device shown in FIGS. 1 and 2 with the cover in the process of being opened using a first gripping element of the cover so as to break a magnetic connection between the keyboard overlay shown in FIG. 20 and the cover.
Figure 24:
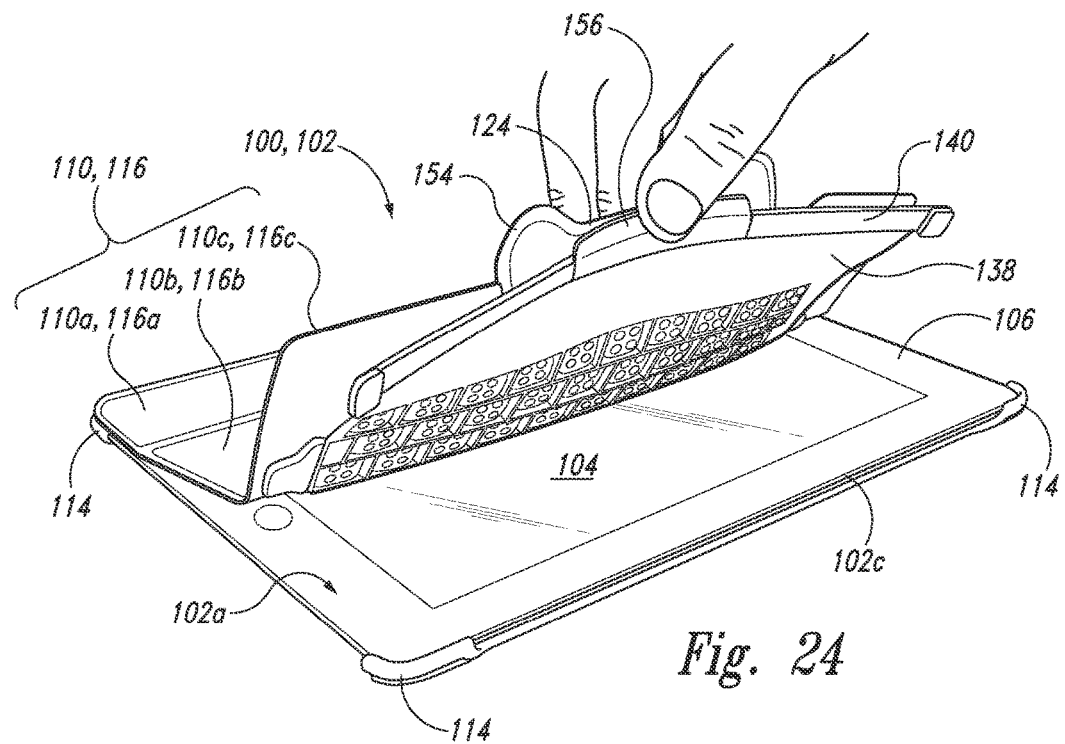
FIG. 24 is a perspective view of the case and the electronic device shown in FIGS. 1 and 2 with the cover in the process of being opened using a second gripping element of the keyboard overlay so as to break a magnetic connection between the keyboard overlay shown in FIG. 20 and the electronic device.

FIGS. 22-24 illustrate use of the case 100 in conjunction with the keyboard overlay 138 when cover 110 is in the closed configuration. FIG. 22 is a profile view of the case 100 and the electronic device 102 with the cover 110 in the closed configuration. The keyboard overlay 138 (not shown in FIG. 22) can be positioned between the distal panel 116c and the front side 102a of the electronic device 102. FIGS. 23 and 24 are, respectively, different perspective views of the case 100 and the electronic device 102 with the cover 110 in the process of being opened so that the keyboard overlay 138 either remains on the front side 102a of the electronic device 102 (FIG. 23) or is withdrawn from the front side 102a of the electronic device 102 (FIG. 24). With reference to FIGS. 22-24 together, the cover 110 can include a pair of first gripping elements 154 at its distal portion 110c. The keyboard overlay 138 can include a second gripping element 156 positioned such that the first and second gripping elements 154, 156 are non-overlapping when the keyboard overlay 138 is in its operable position at the front side 102a of the electronic device 102 and the cover 110 is in the closed configuration. In the illustrated embodiment, the first gripping elements 154 are rounded flaps extending distally from a distal edge of the first coupling component 124 and the second gripping element 156 is positioned between the first gripping elements 154 when the keyboard overlay 138 is in its operable position at the front side 102a of the electronic device 102 and the cover 110 is in the closed configuration. In other embodiments, the first and second gripping elements 154, 156 can have other suitable forms. As shown in FIG. 23, the first gripping elements 154 can be configured to facilitate breaking a magnetic connection between the cover 110 and the keyboard overlay 138 when the keyboard overlay 138 is in its operable position and the cover 110 is being moved out of the closed configuration. As shown FIG. 24, the second gripping element 156 can be configured to facilitate breaking a magnetic connection between the keyboard overlay 138 and an embedded magnet (not shown) within the peripheral region 106 of the electronic device 102 when the keyboard overlay 138 is in its operable position the cover 110 is being moved out of the closed configuration.

Figure 25:
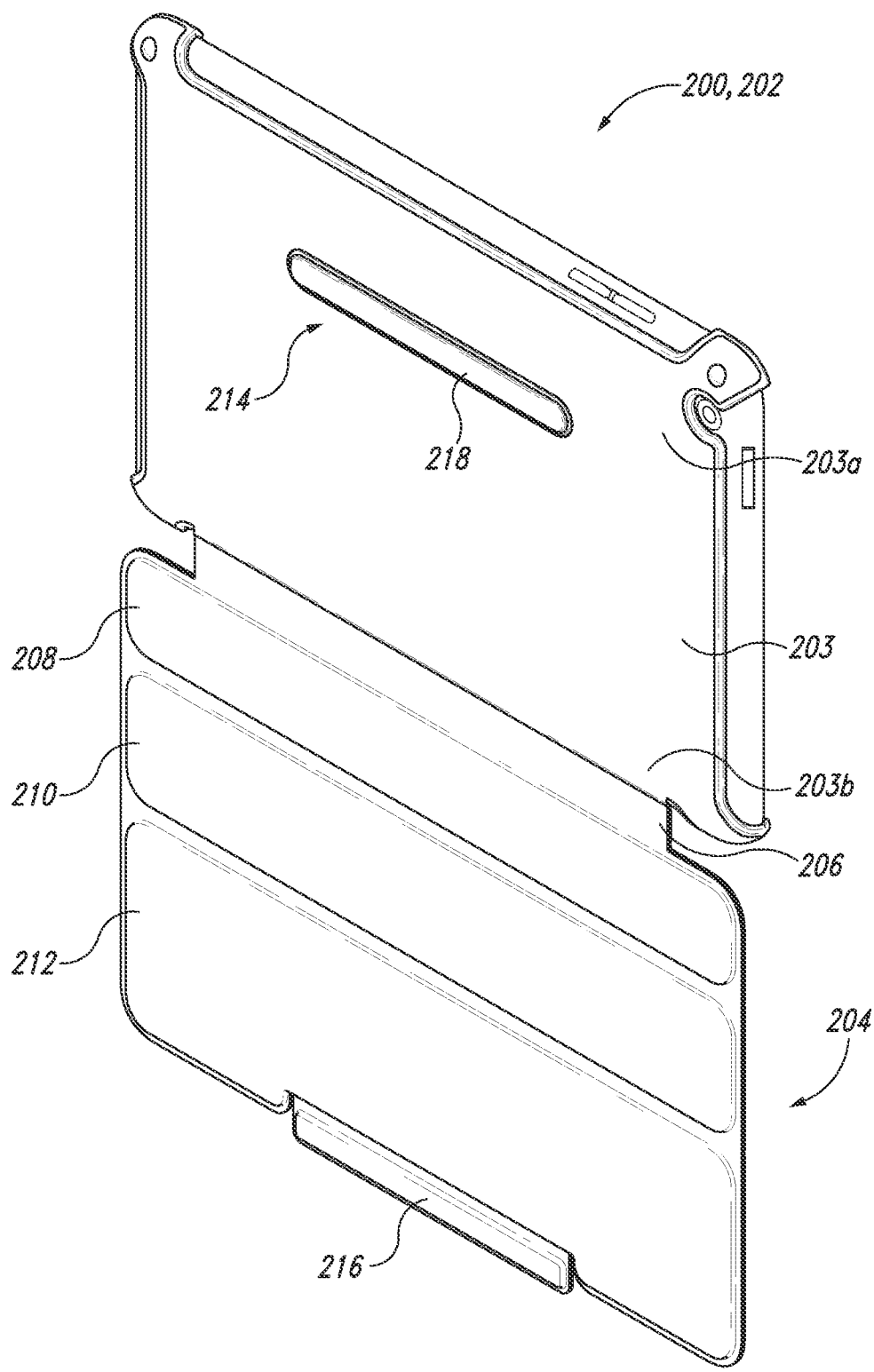
FIGS. 25 and 26 are, respectively, different perspective views of a protective case configured in accordance with another embodiment of the present technology and an associated electronic device.
Figure 26:
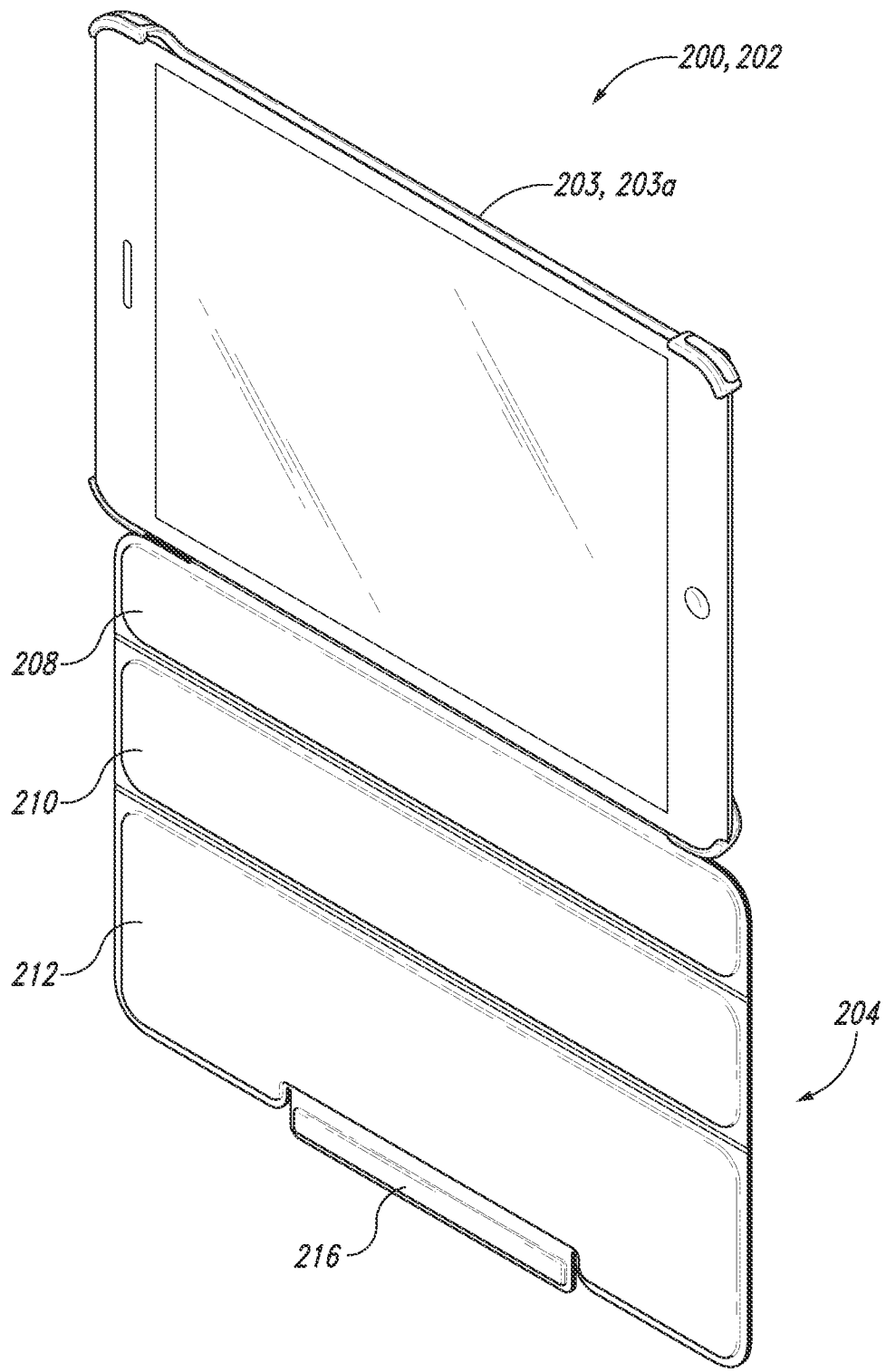
Figure 27:
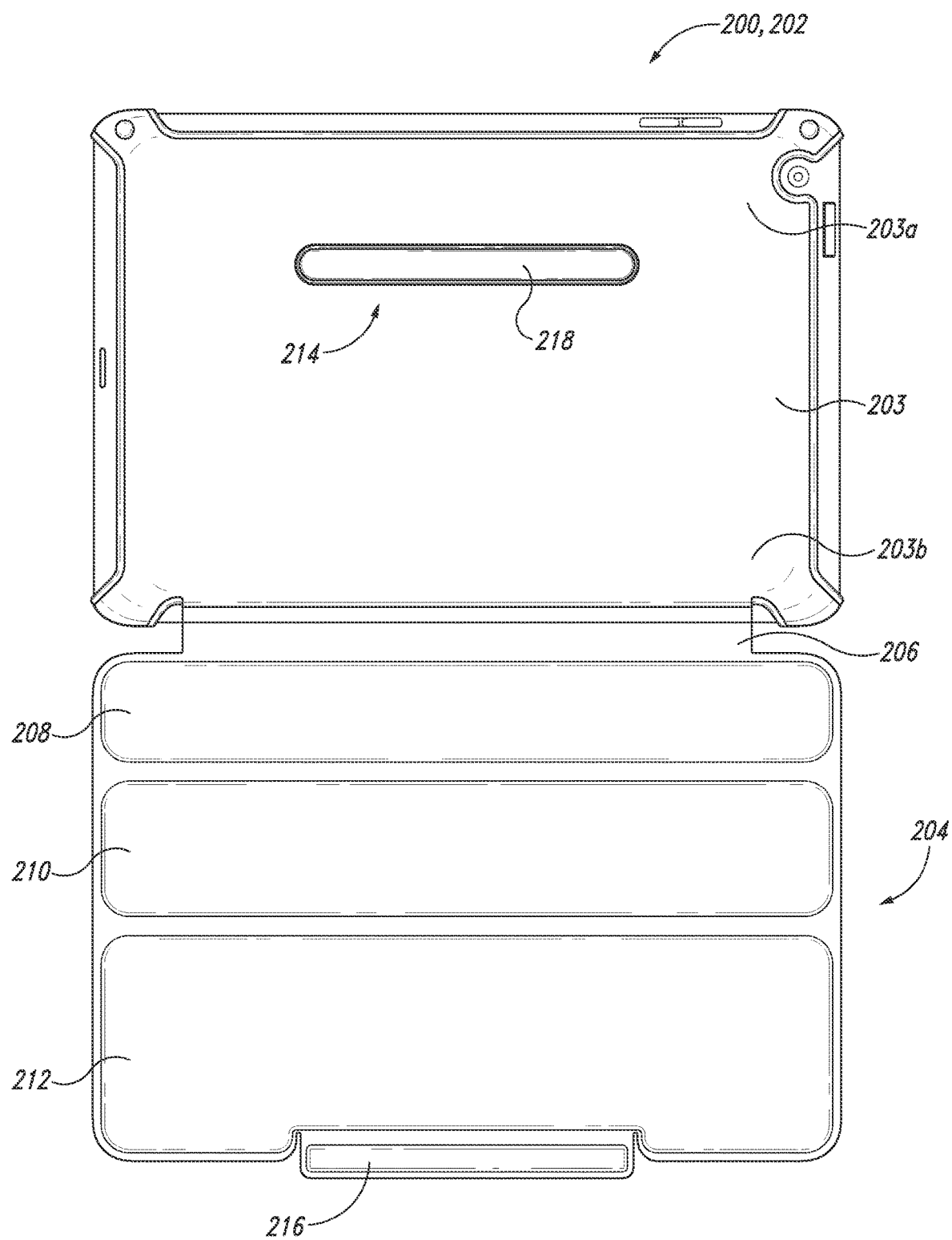
FIGS. 27-32 are, respectively, an inverse plan view, a plan view, a first side profile view, a second side profile view, a first end profile view, and a second end profile view of the case and the electronic device shown in FIGS. 25 and 26.
Figure 28:
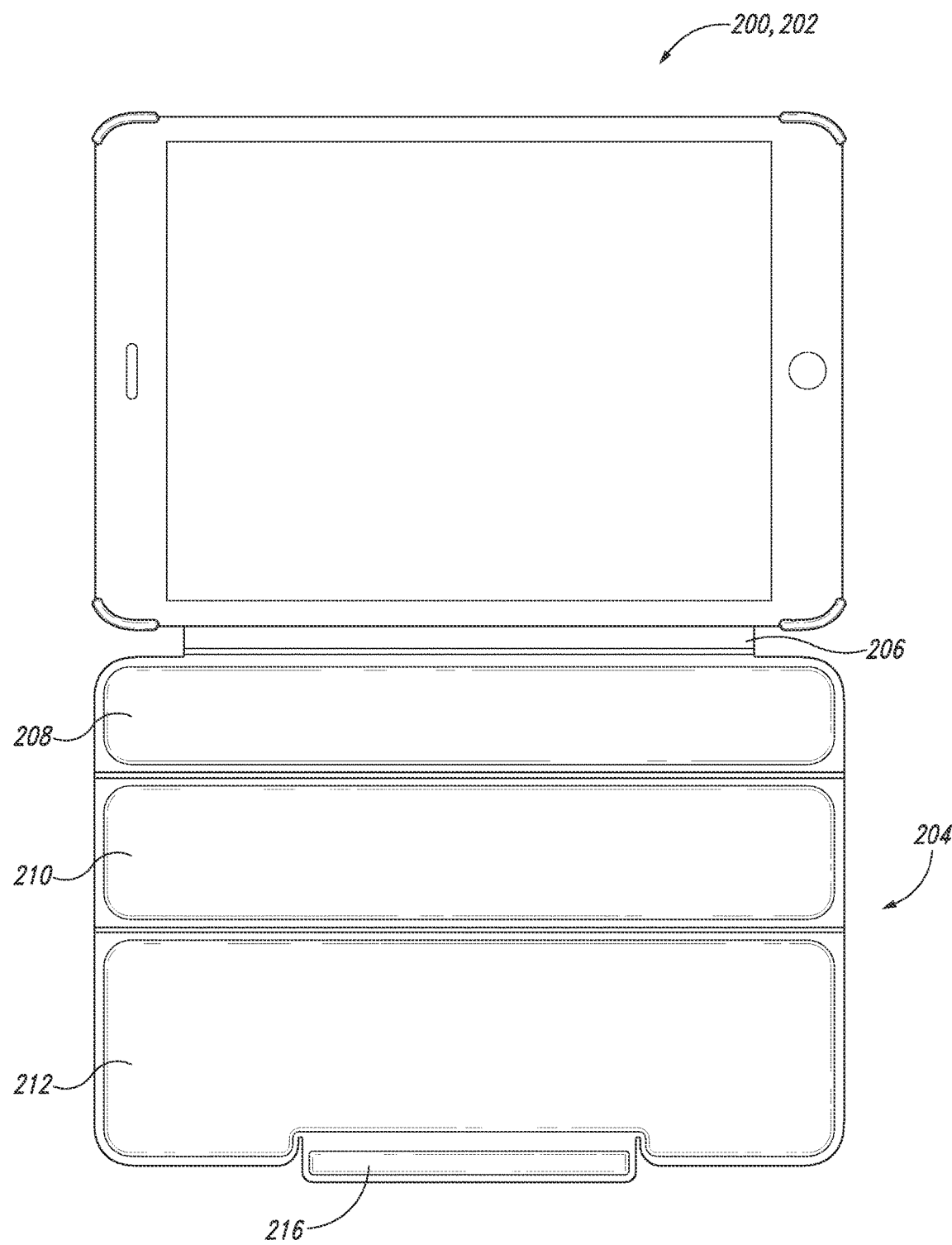
Figure 29:
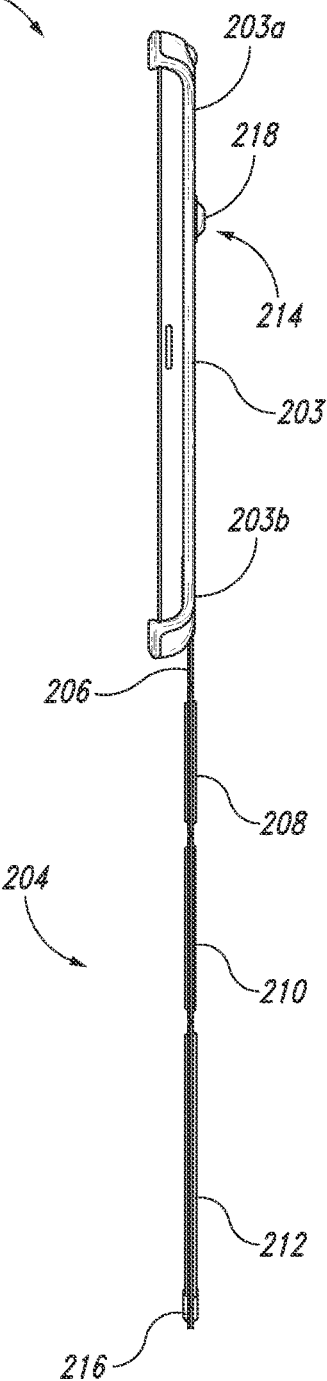
Figure 30:
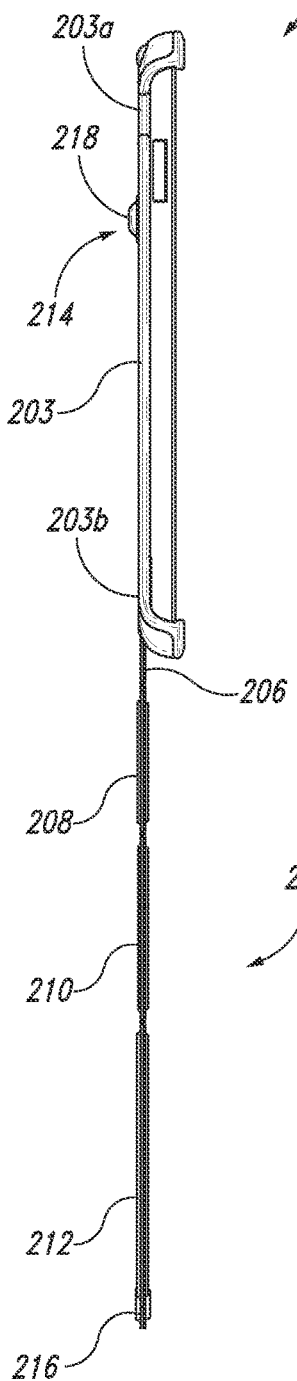
Figure 31:
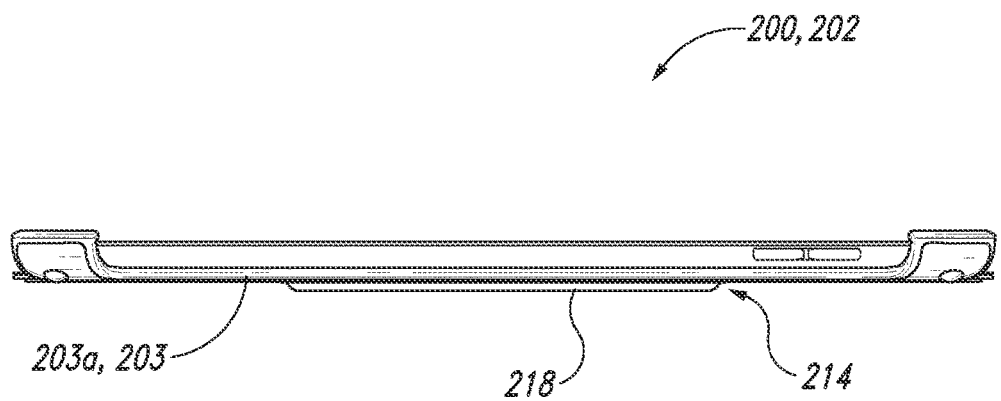
Figure 32:
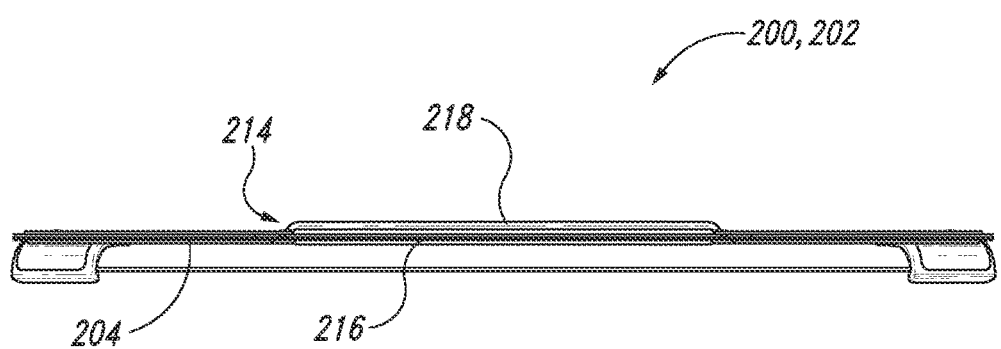

FIGS. 25 and 26 are, respectively, different perspective views of a protective case 200 configured in accordance with another embodiment of the present technology and an associated electronic device 202. FIGS. 27-32 are, respectively, an inverse plan view, a plan view, a first side profile view, a second side profile view, a first end profile view, and a second end profile view of the case 200 and the electronic device 202. With reference to FIGS. 25-32 together, the case 200 can be generally similar to the case 100 discussed above with reference to FIGS. 1-24. The case 200 can include a backing 203 having a first end portion 203a (e.g., a leading end portion) and an opposite second end portion 203b (e.g., a trailing end portion). The case 200 can further include cover 204 and a joint 206 extending between the backing 203 and the cover 204. The cover 204 can include a proximal panel 208, an intermediate panel 210, and a distal panel 212 increasingly distant from the joint 206. Spaced apart from its first and second end portions 203a, 203b, the backing 203 can include a first coupling component 214. Extending distally from the distal panel 212, the cover 204 can include a second coupling component 216.

With reference to FIGS. 1-32 together, the cases 100, 200 can be configured for use with different types of electronic devices. For example, the electronic device 202 can be smaller and/or lighter than the electronic device 102. In the context of use with relatively small and light electronic devices, it may be useful to modify the first and second coupling components 124, 126. For example, instead of including the bearing 127, the first coupling component 214 can include a flat bearing 218. The downward forces associated with use of a smaller and lighter electronic device may tend to be less than the downward forces associated with use of a larger and heavier electronic device. Accordingly, in some embodiments, the structural advantage of the bearing 127 may be unnecessary and a lower profile of the bearing 218 may be desirable. Other factors can also influence selection of the bearing 218 over the bearing 127 or selection of other suitable configurations of the first coupling component 214.

Although the bearings 127, 218 in the embodiments illustrated in FIGS. 1-32 project outwardly from the respective backings 108, 203, in other embodiments the bearings 127, 218 can be flush with or inset into the respective backings 108, 203. For example, the second coupling components 126, 216 can be embedded within the respective backings 108, 203. Furthermore, the second coupling components 126, 216 can be covered with a cloth or another flexible material that extends over the respective backings 108, 203. Still further, the second coupling components 126, 216 and the respective backings 108, 203 can be compositionally the same or similar. For example, the second coupling components 126, 216 can be co-molded with the respective backings 108, 203 from the same material. Other configurations for the second coupling components 126, 216 and the backings 108, 203 are also possible.

Figure 33:
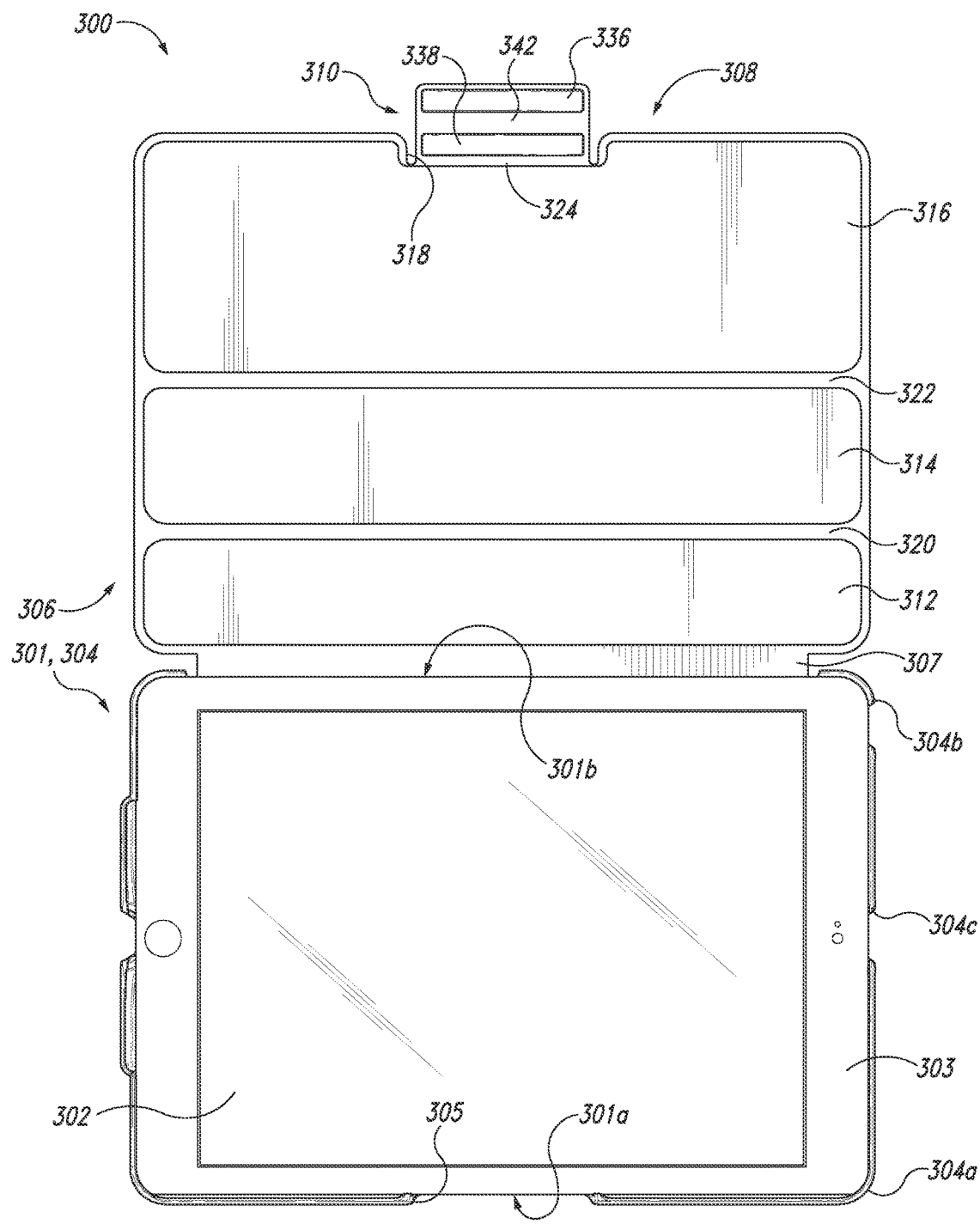
FIG. 33 is a plan view of a protective case configured in accordance with another embodiment of the present technology and an associated electronic device. The case can include a backing, a cover, and a joint therebetween. The cover can include a screen protector and a tab hingedly connected to the screen protector.
Figure 34:
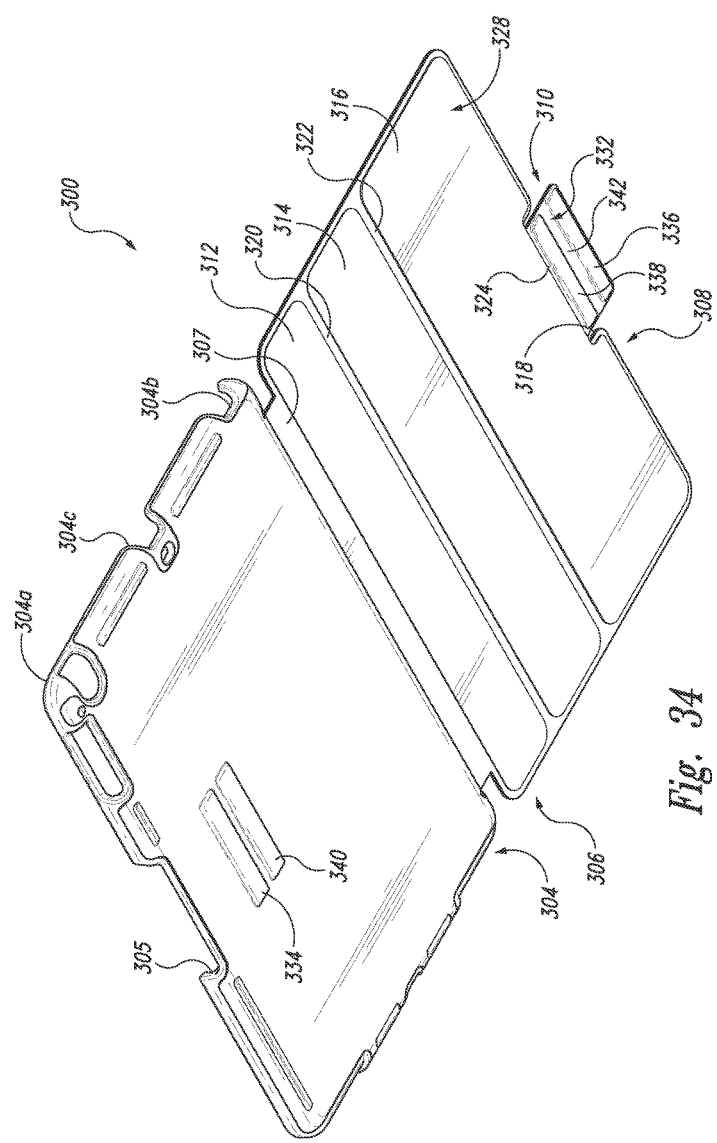
FIGS. 34 and 35 are, respectively, different perspective views of the case shown in FIG. 33.
Figure 35:
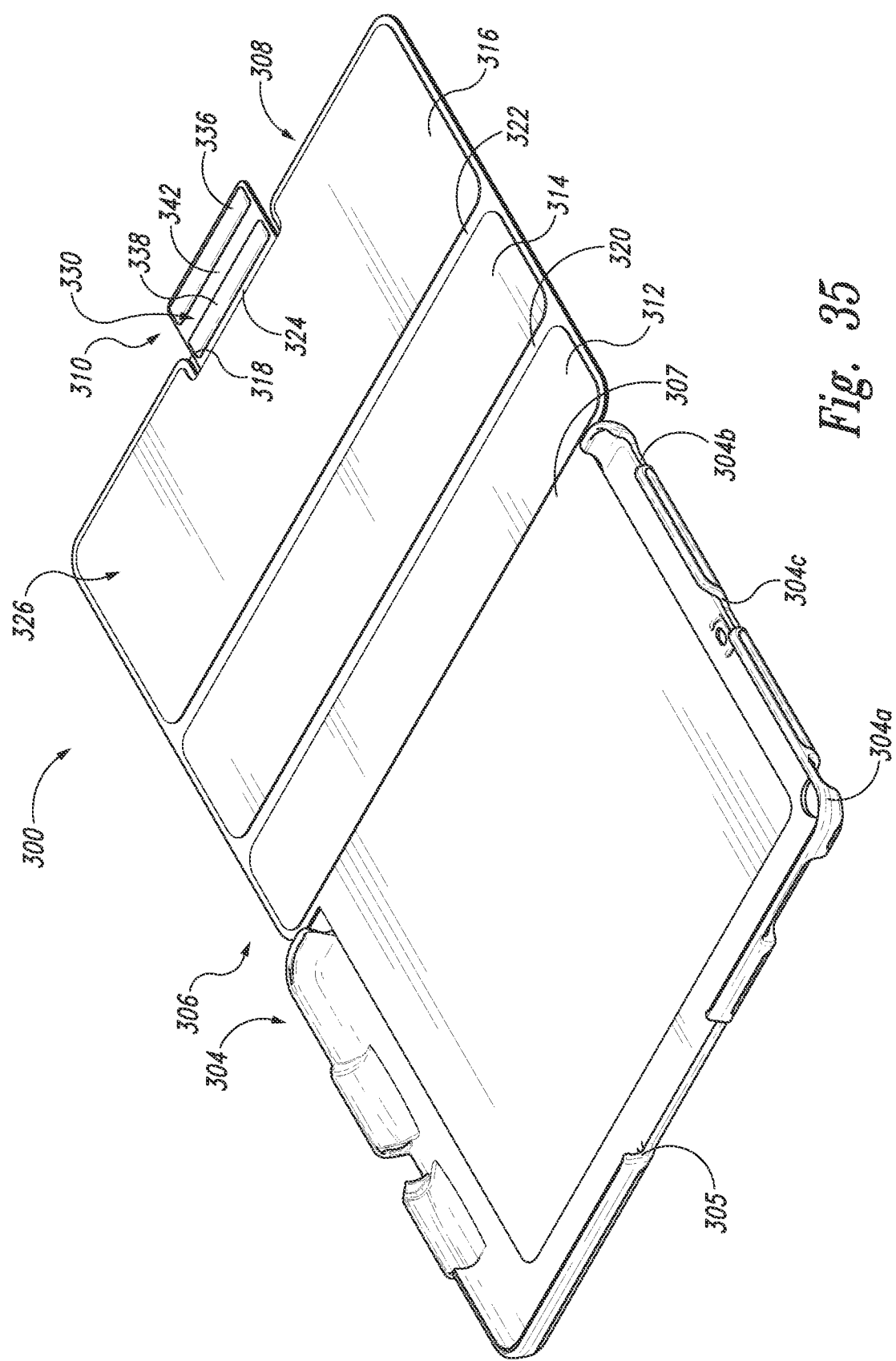
Figure 36:
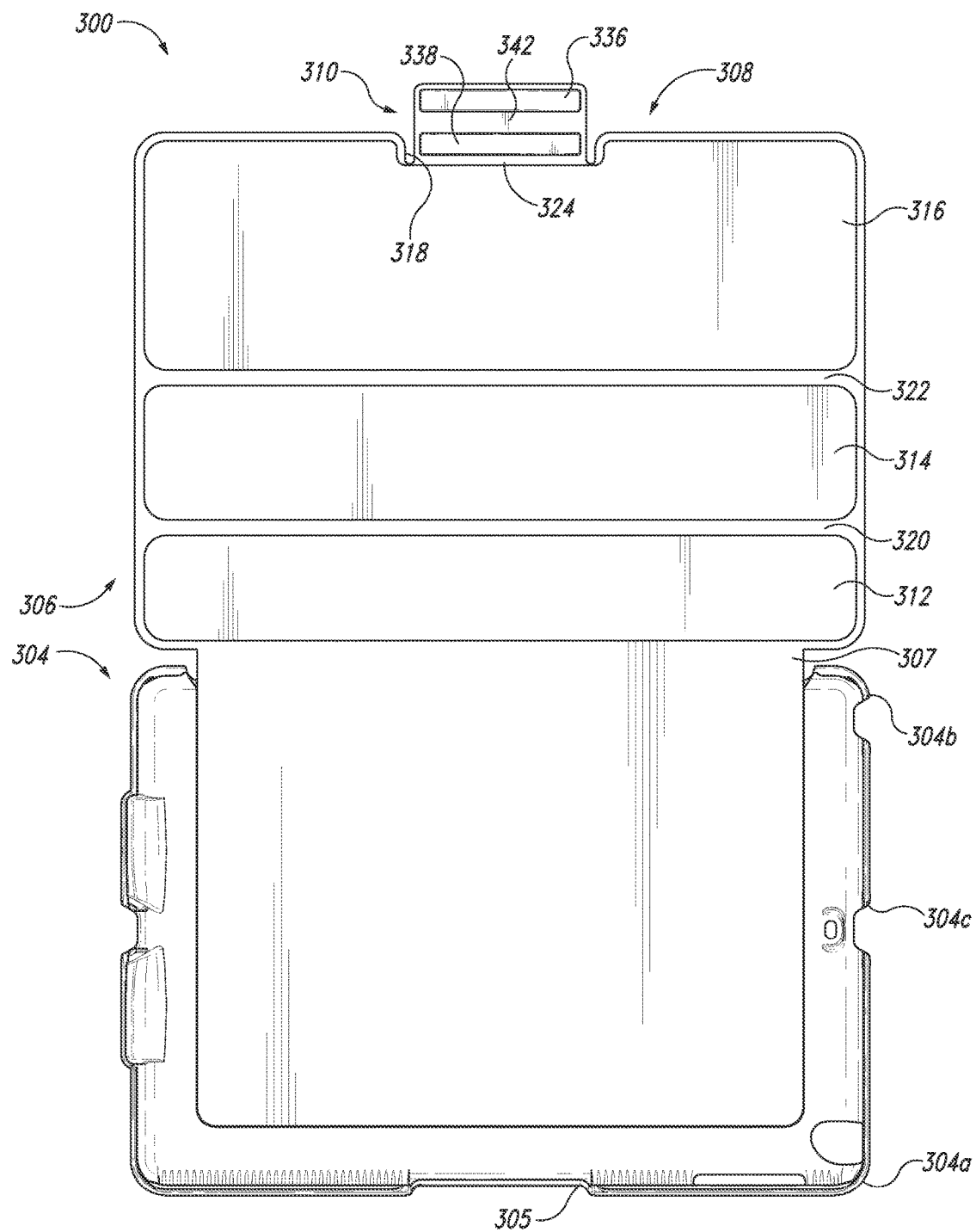
Figure 37:
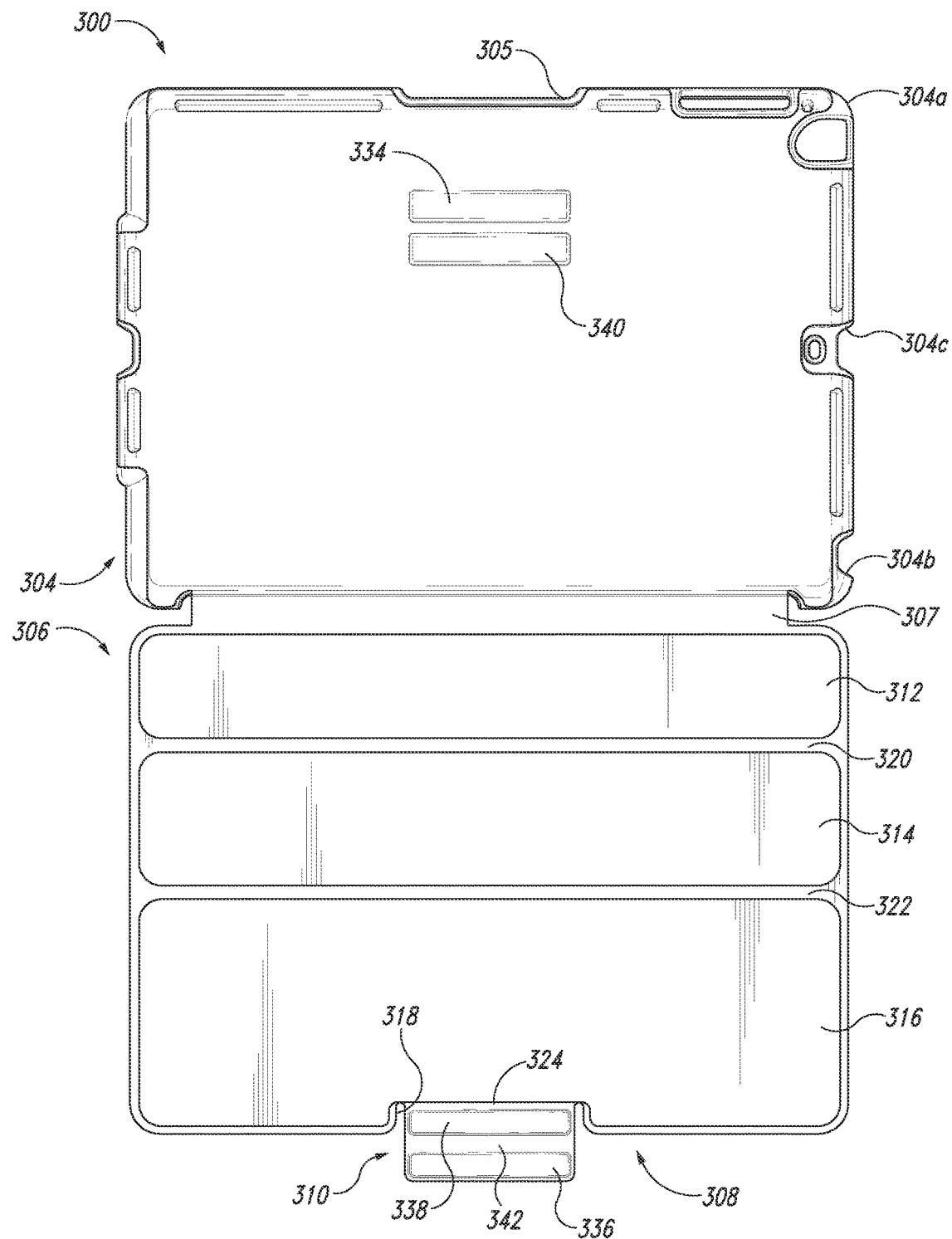
Figure 40:
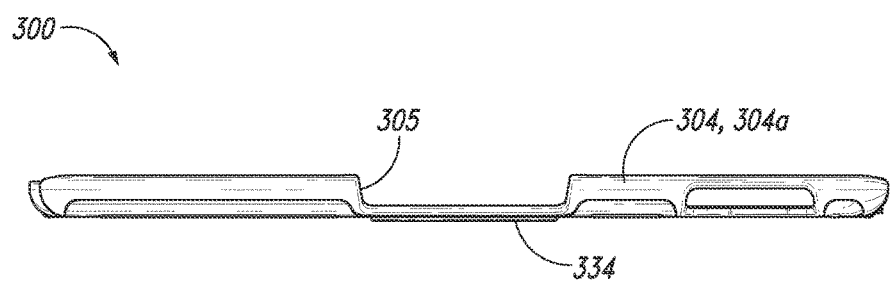
Figure 41:
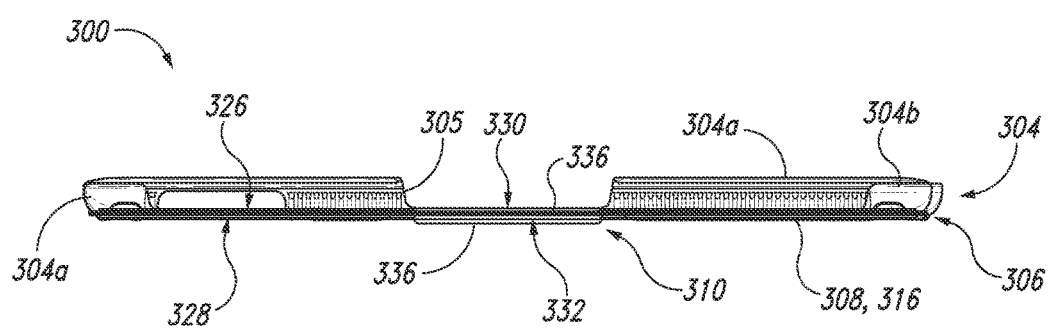

FIG. 33 is a plan view of a protective case 300 configured in accordance with another embodiment of the present technology and an associated electronic device 301. FIGS. 34 and 35 are, respectively, different perspective views of the case 300. FIGS. 36-41 are, respectively, a plan view, an inverse plan view, a first side profile view, a second side profile view, a first end profile view, and a second end profile view of the case 300. With reference to FIGS. 33-41 together, the case 300 can be generally similar to the case 100 discussed above with reference to FIG. 1-24 and to the case 200 discussed above with reference to FIG. 25-32. The case 300 can be configured for use with the electronic device 301, which is shown in FIG. 33 and omitted from FIGS. 34-41 for clarity of illustration. With reference to FIG. 33, the electronic device 301 can be slab-shaped with a front side, a back side (not shown) opposite to the front side, a first edge 301a (e.g., a leading edge), and a second edge 301b (e.g., a trailing edge) opposite to the first edge 301a. At its front side, the electronic device 301 can include a screen 302 and a peripheral region 303 around a perimeter of the screen 302. With reference again to FIGS. 33-41 together, the case 300 can include a backing 304 shaped to securely attach to the back side of the electronic device 301. For example, the backing 304 can have a first end portion 304a (e.g., a leading end portion) configured to receive the first edge 301a of the electronic device 301, an opposite second end portion 304b (e.g., a trailing end portion) configured to receive the second edge 301b of the electronic device 301, and a middle portion 304c extending between the first and second end portions 304a, 304b. At its first end portion 304a, the backing 304 can include a centrally positioned first inset 305. As further discussed below, the first inset 305 can be useful, for example, for facilitating low-profile, secure, and/or otherwise advantageous closure of the case 300 around the electronic device 301.

The case 300 can include a cover 306 hingedly connected to the backing 304. The case 300 can further include a first joint 307 operably positioned between the backing 304 and the cover 306. The cover 306 can include a screen protector 308 proximally connected to the first joint 307. The cover 306 can further include a tab 310 hingedly connected to the screen protector 308. The screen protector 308 can include a proximal panel 312, an intermediate panel 314, and a distal panel 316 increasingly distant from the first joint 307. The proximal panel 312 can be closest to the first joint 307, the distal panel 316 can be furthest from the first joint 307, and the intermediate panel 314 can be between the proximal and distal panels 312, 316. The distal panel 316 can have a distally oriented second inset 318 in which at least a portion of the tab 310 is positioned. For example, the tab 310 can extend distally from the distal panel 316 beginning at a proximalmost portion of the second inset 318. The screen protector 308 can further include a second joint 320 operably positioned between the proximal and intermediate panels 312, 314, a third joint 322 operably positioned between the intermediate and distal panels 314, 316, and a fourth joint 324 operably positioned between the distal panel 316 and the tab 310. One, some, or all of the first, second, third, and fourth joints 307, 320, 322, 324 can be flexure bearings. For example, the proximal, intermediate, and distal panels 312, 314, 316 can be rigid or semi-rigid plates disposed along a flexible webbing and the first, second, third, and fourth joints 307, 320, 322, 324 can be respective unsupported portions of the webbing.

The first joint 307 can be bendable along a bending axis to allow the cover 306 to move between a closed configuration and an open configuration. In both configurations, the backing 304 can be securely attached to the electronic device 301. When the cover 306 is in the closed configuration, the screen protector 308 can be disposed along the front side of the electronic device 301 and at least a portion of the tab 310 can be stowed (e.g., magnetically stowed) within the first inset 305. In the illustrated embodiment, the first inset 305 defines a window through which a portion of the first edge 301a of the electronic device 301 is exposed from within the backing 304 when the cover 306 is in the open configuration. When the cover 306 is in the closed configuration, the tab 310 can be attached (e.g., magnetically attached) to the electronic device 301 via the window. In another embodiment, the first inset 305 can define a recess rather than a window. In such an embodiment, the tab 310 can be attached (e.g., magnetically attached) to the backing 304 at the recess rather than being attached to the electronic device 301. Other configurations of the first inset 305 and other manners in which the first inset 305 may interact with the tab 310 are also possible.

With reference again to FIGS. 33-41 together, the screen protector 308 and the tab 310 can be flat when fully extended distally from the first joint 307. When the cover 306 is in the closed configuration, the screen protector 308 can lie flat against the front side of the electronic device 301 and the tab 310 can curve around the first edge 301a of the electronic device 301. The screen protector 308 can have a first side 326 that faces toward the electronic device 301 when the cover 306 is in the closed configuration and a second side 328, opposite to the first side 326, that faces away from the electronic device 301 when the cover 306 is in the closed configuration. Similarly, the tab 310 can have a first side 330 that faces toward the electronic device 301 when the cover 306 is in the closed configuration and a second side 332, opposite to the first side 330, that faces away from the electronic device 301 when the cover 306 is in the closed configuration. When the cover 306 is in the open configuration, the first side 330 of the tab 310 can face away from the electronic device 301 and the second side 332 of the tab 310 can face toward the electronic device 301. Also, when the cover 306 is in the open configuration, the screen protector 308 can form a support structure that supports the electronic device 301 at an angle relative to a horizontal support surface. For example, the screen protector 308 can form a support structure having one of the subconfigurations described above with reference to FIGS. 10-19 or another suitable subconfiguration. In some of these subconfigurations, the tab 310 is releasably attached (e.g., magnetically attached) to the backing 304, such as between the first and second end portions 304a, 304b of the backing 304. In other subconfigurations, the tab 310 can be detached from the backing 304.

The backing 304 and the tab 310 can respectively include one or more features that facilitate magnetic coupling. For example, at its middle portion 304c, the backing 304 can include a first magnetic region 334. The tab 310 can include a second magnetic region 336 configured to interact magnetically with the first magnetic region 334. In the illustrated embodiment, the tab 310 includes a third magnetic region 338 hingedly connected to the second magnetic region 336. Furthermore, in the illustrated embodiment, the backing 304 includes a fourth magnetic region 340 disposed between the first magnetic region 334 and the first joint 307. The third and fourth magnetic regions 338, 340 can be configured to interact magnetically with one another. In another embodiment, the fourth magnetic region 340 is omitted. In yet another embodiment, both the third and fourth magnetic regions 338, 340 are omitted. With reference again to FIGS. 33-41 together, the first, second, third, and fourth magnetic regions 334, 336, 338, 340 can be elongate with respective lengths parallel to one another and to the bending axis. Operably positioned between the second and third magnetic regions 336, 338, the tab 310 can include a fifth joint 342, which can be, for example, a flexure bearing.

Figure 44A:
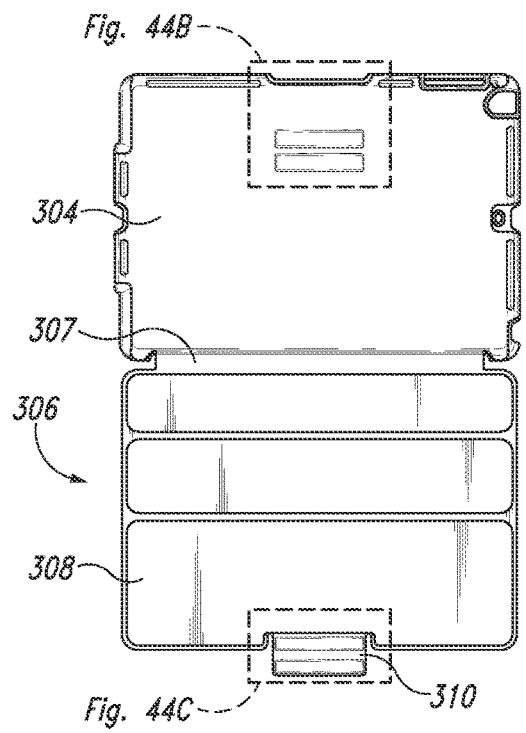
FIG. 44A is an inverse plan view of the case and the electronic device shown in FIG. 33.
Figure 44B:
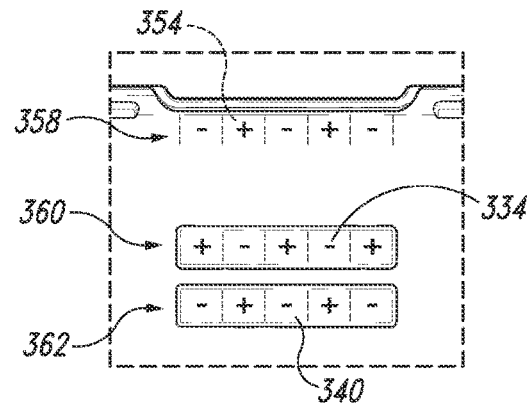
FIGS. 44B and 44C are enlargements of respective portions of FIG. 44A.
Figure 44C:
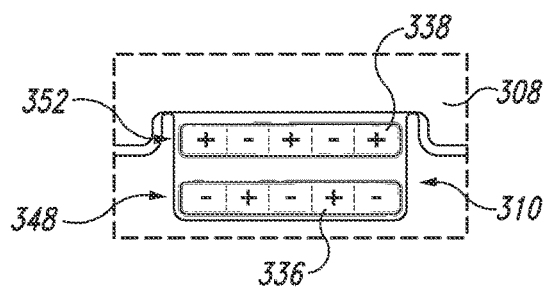
Figure 45A:
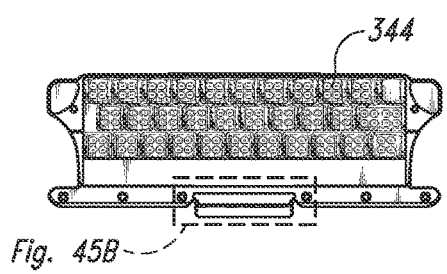
FIG. 45A is an inverse plan view of the keyboard overlay.
Figure 45B:
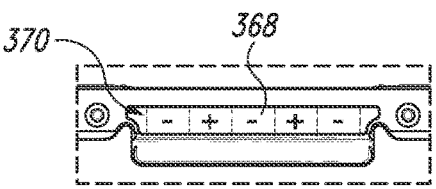
FIG. 45B is an enlargement of a portion of FIG. 45A.

FIG. 42A is a plan view of the case 300 and the electronic device 301. FIGS. 42B and 42C are enlargements of respective portions of FIG. 42A. FIG. 43A is a plan view of a keyboard overlay 344 that can be used with the case 300 and the electronic device 301 in a system configured in accordance with an embodiment of the present technology. FIG. 43B is an enlargement of a portion of FIG. 43A. FIG. 44A is an inverse plan view of the case 300 and the electronic device 301. FIGS. 44B and 44C are enlargements of respective portions of FIG. 44A. FIG. 45A is an inverse plan view of the keyboard overlay 344. FIG. 45B is an enlargement of a portion of FIG. 45A. With reference to FIGS. 42A-45B, the first, second, third, and fourth magnetic regions 334, 336, 338, 340 can have different respective distributions of magnetic polarities parallel to the bending axis. These distributions of magnetic polarities can be interrelated and can be useful, for example, to promote desired magnetic interactions, to suppress undesired magnetic interactions, to enhance registration of components of the case 300, and/or for other purposes.

The second magnetic region 336 can have a first distribution of magnetic polarities 346 (FIG. 42B) and a second distribution of magnetic polarities 348 (FIG. 44C) parallel to the bending axis at the first side 330 and the second side 332 of the tab 310, respectively, when the tab 310 is fully extended distally from the screen protector 308. Similarly, the third magnetic region 338 can have a first distribution of magnetic polarities 350 (FIG. 42B) and a second distribution of magnetic polarities 352 (FIG. 44C) parallel to the bending axis at the first side 330 and the second side 332 of the tab 310, respectively, when the tab 310 is fully extended distally from the screen protector 308. The first distribution of magnetic polarities 346 of the second magnetic region 336 and the first distribution of magnetic polarities 350 of the third magnetic region 338 can be different. For example, the first distribution of magnetic polarities 346 of the second magnetic region 336 and the first distribution of magnetic polarities 350 of the third magnetic region 338 can be different alternating polarity distributions. In at least some cases, the first distribution of magnetic polarities 346 of the second magnetic region 336 is an inverse of the first distribution of magnetic polarities 350 of the third magnetic region 338.

The electronic device 301 can include an elongate magnetic region 354 at least proximate to its first edge 301a and having a length parallel to the bending axis when the backing 304 is securely attached to the electronic device 301. The magnetic region 354 of the electronic device 301 can have a first distribution of magnetic polarities 356 (FIG. 42C) and a second distribution of magnetic polarities 358 (FIG. 44B) parallel to the bending axis at the front side and the back side of the electronic device 301, respectively, when the backing 304 is securely attached to the electronic device 301. In at least some cases, the first distribution of magnetic polarities 350 of the third magnetic region 338 is selected such that overlaying the third magnetic region 338 over the magnetic region 354 of the electronic device 301 triggers a switch or another electrical feature within the electronic device 301 to change an operational state of the electronic device 301. In a particular example, overlaying the third magnetic region 338 over the magnetic region 354 of the electronic device 301 puts the electronic device 301 into a sleep mode (e.g., a low-power mode) and separating the third magnetic region 338 from the magnetic region 354 of the electronic device 301 puts the electronic device 301 into an awake mode (e.g., a high-power mode). Other types of operational changes in the electronic device 301 resulting from overlaying the third magnetic region 338 over the magnetic region 354 of the electronic device 301 or separating the third magnetic region 338 from the magnetic region 354 of the electronic device 301 are also possible.

In many cases, magnetic attachment of the third magnetic region 338 and the magnetic region 354 of the electronic device 301 alone is not sufficiently strong to reliably maintain the cover 306 in the closed configuration. For example, when the case 300 and the electronic device 301 are subjected to rough handling, shear forces resulting from rubbing the screen protector 308 against another object may be greater than the resistance of a magnetic connection between the third magnetic region 338 and the magnetic region 354 of the electronic device 301 to such forces. Supplementing this magnetic connection with another magnetic connection between the tab 310 and the electronic device 301 can be useful to at least partially address this problem. The first distribution of magnetic polarities 346 of the second magnetic region 336 and the second distribution of magnetic polarities 356 of the magnetic region 354 of the electronic device 301 can be complementary for registered magnetic attachment of the second magnetic region 336 and the magnetic region 354 of the electronic device 301 to one another when the cover 306 is in the closed configuration. The respective slipping planes of (a) the magnetic connection between the third magnetic region 338 and the magnetic region 354 of the electronic device 301 and (b) between the second magnetic region 336 and the magnetic region 354 of the electronic device 301 can be different (e.g., non-parallel). For this and/or other reasons, the overall connection between the tab 310 and the electronic device 301 can be relatively robust.

The first and fourth magnetic regions 334, 340 can be configured to magnetically interact with the second and third magnetic regions 336, 338, respectively, when the cover 306 is in the open configuration. The first magnetic region 334 can have an outwardly oriented distribution of magnetic polarities 360 (FIG. 44B) parallel to the bending axis. Similarly, the fourth magnetic region 340 can have an outwardly oriented distribution of magnetic polarities 362 (FIG. 44B) parallel to the bending axis. The distribution of magnetic polarities 360 of the first magnetic region 334 and the distribution of magnetic polarities 362 of the fourth magnetic region 340 can be different. For example, the distribution of magnetic polarities 360 of the first magnetic region 334 and the distribution of magnetic polarities 362 of the fourth magnetic region 340 can be different alternating polarity distributions. In at least some cases, the distribution of magnetic polarities 360 of the first magnetic region 334 is an inverse of the distribution of magnetic polarities 362 of the fourth magnetic region 340. The distribution of magnetic polarities 360 of the first magnetic region 334 and the second distribution of magnetic polarities 348 of the second magnetic region 336 can be complementary for registered magnetic attachment of the first and second magnetic regions 334, 336 to one another when the cover 306 is in the open configuration. Similarly, the distribution of magnetic polarities 362 of the fourth magnetic region 340 and the second distribution of magnetic polarities 352 of the third magnetic region 338 can be complementary for registered magnetic attachment of the third and fourth magnetic regions 338, 340 to one another when the cover 306 is in the open configuration.

In at least some embodiments, the tab 310 is foldable at the fifth joint 342 such that the second and third magnetic regions 336, 338 are magnetically attached to one another and overlapping. For example, the tab 310 can have a first folded configuration in which the first distribution of magnetic polarities 350 of the third magnetic region 338 and the first distribution of magnetic polarities 346 of the second magnetic region 336 are at the first and second sides 330, 332 of the tab 310, respectively. The second distribution of magnetic polarities 348 of the second magnetic region 336 and the second distribution of magnetic polarities 352 of the third magnetic region 338 can be complementary for registered magnetic attachment of the second and third magnetic regions 336, 338 to one another to facilitate folding the tab 310 into the first folded configuration. In addition or alternatively, the tab 310 can have a second folded configuration in which the second distribution of magnetic polarities 348 of the second magnetic region 336 and the second distribution of magnetic polarities 352 of the third magnetic region 338 are at the first and second sides 330, 332 of the tab 310, respectively. The first distribution of magnetic polarities 346 of the second magnetic region 336 and the first distribution of magnetic polarities 350 of the third magnetic region 338 can be complementary for registered magnetic attachment of the second and third magnetic regions 336, 338 to one another to facilitate folding the tab 310 into the second folded configuration. The fifth joint 342 can be configured to bend in a first direction to move the tab 310 into the first folded configuration and/or in an opposite second direction to move the tab 310 into the second folded configuration.

When the tab 310 is in the first folded configuration, because the second and third magnetic regions 336, 338 are overlapping, the respective strengths of the first distribution of magnetic polarities 350 of the third magnetic region 338 and the first distribution of magnetic polarities 346 of the second magnetic region 336 can be greater (e.g., about two times greater) than when the tab 310 is fully extended distally from the distal panel 316. Similarly, when the tab 310 is in the second folded configuration, because the second and third magnetic regions 336, 338 are overlapping, the respective strengths of the second distribution of magnetic polarities 348 of the second magnetic region 336 and the second distribution of magnetic polarities 352 of the third magnetic region 338 can be greater (e.g., about two times greater) than when the tab 310 is fully extended distally from the distal panel 316. As discussed below, the ability to conveniently increase the magnetic bonding capacity of the tab 310 can have functional significance.

The keyboard overlay 344 can have a first side (visible in FIG. 45A) and a second side (visible in FIG. 43B) opposite to the first side. When in an operable position on the front side of the electronic device 301, the first side of the keyboard overlay 344 can face toward the electronic device 301 and the second side of the keyboard overlay 344 can face away from the electronic device 301. The keyboard overlay 344 can include an elongate magnetic region 368 having a length parallel to the bending axis when the backing 304 is securely attached to the electronic device 301 and the keyboard overlay 344 is in the operable position. The magnetic region 368 of the keyboard overlay 344 can facilitate consistent positioning of the keyboard overlay 344 relative to the screen 302. For example, the magnetic region 368 of the keyboard overlay 344 can have a first distribution of magnetic polarities 370 (FIG. 45B) and a second distribution of magnetic polarities 372 (FIG. 43B) parallel to the bending axis at the first and second sides of the keyboard overlay 344, respectively, when the backing 304 is securely attached to the electronic device 301 and the keyboard overlay 344 is in the operable position. The first distribution of magnetic polarities 356 of the magnetic region 354 of the electronic device 301 and the first distribution of magnetic polarities 370 of the magnetic region 368 of the keyboard overlay 344 can be complementary for registered magnetic attachment of the magnetic region 354 of the electronic device 301 and the magnetic region 368 of the keyboard overlay 344 to one another when the backing 304 is securely attached to the electronic device 301 and the keyboard overlay 344 is in the operable position. Similarly, the first distribution of magnetic polarities 350 of the third magnetic region 338 and the second distribution of magnetic polarities 372 of the magnetic region 368 of the keyboard overlay 344 can be complementary for registered magnetic attachment of the third magnetic region 338 and the magnetic region 368 of the keyboard overlay 344 to one another when the cover 306 is in the closed configuration.

Figure 46:
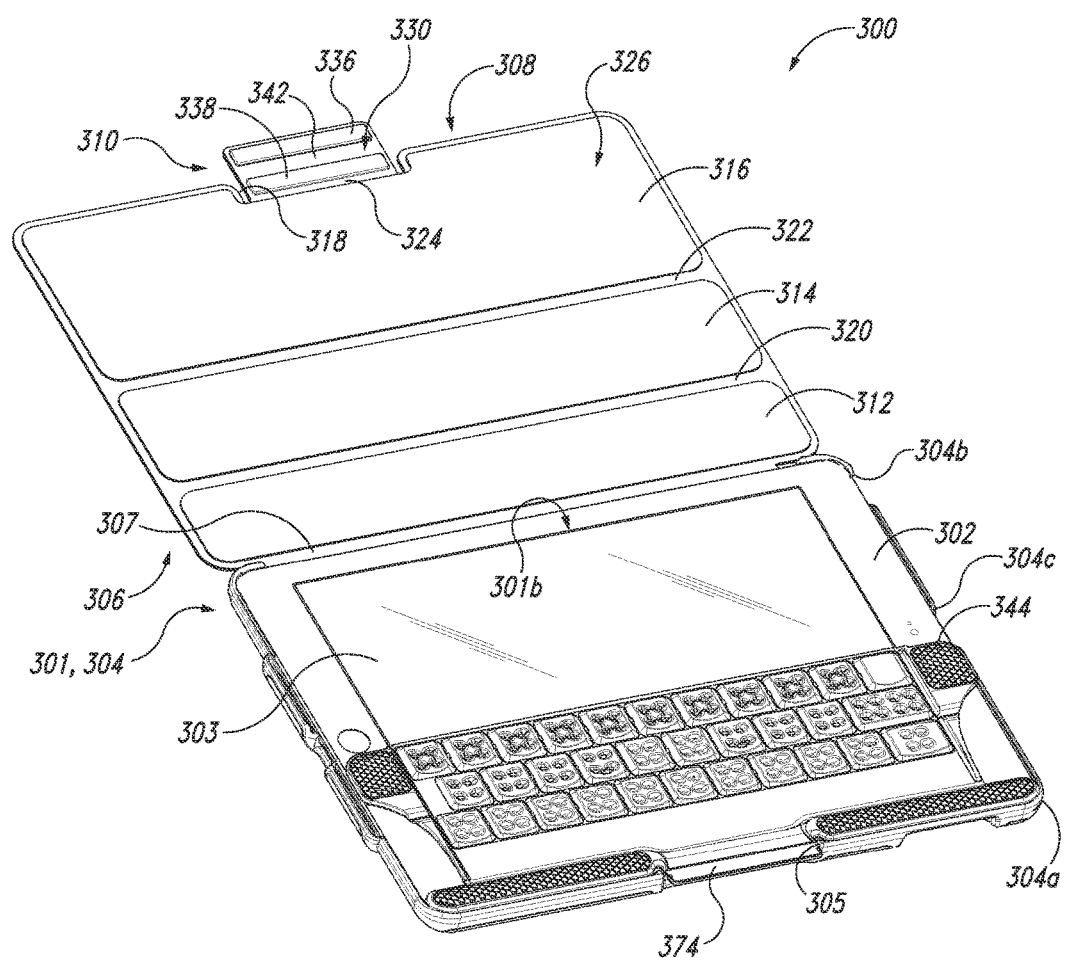
FIG. 46 is a perspective view of the case and the electronic device shown in FIG. 33 and the keyboard overlay shown in FIG. 43A, with the cover in an extended configuration and the keyboard overlay in an operable position.
Figure 47A:
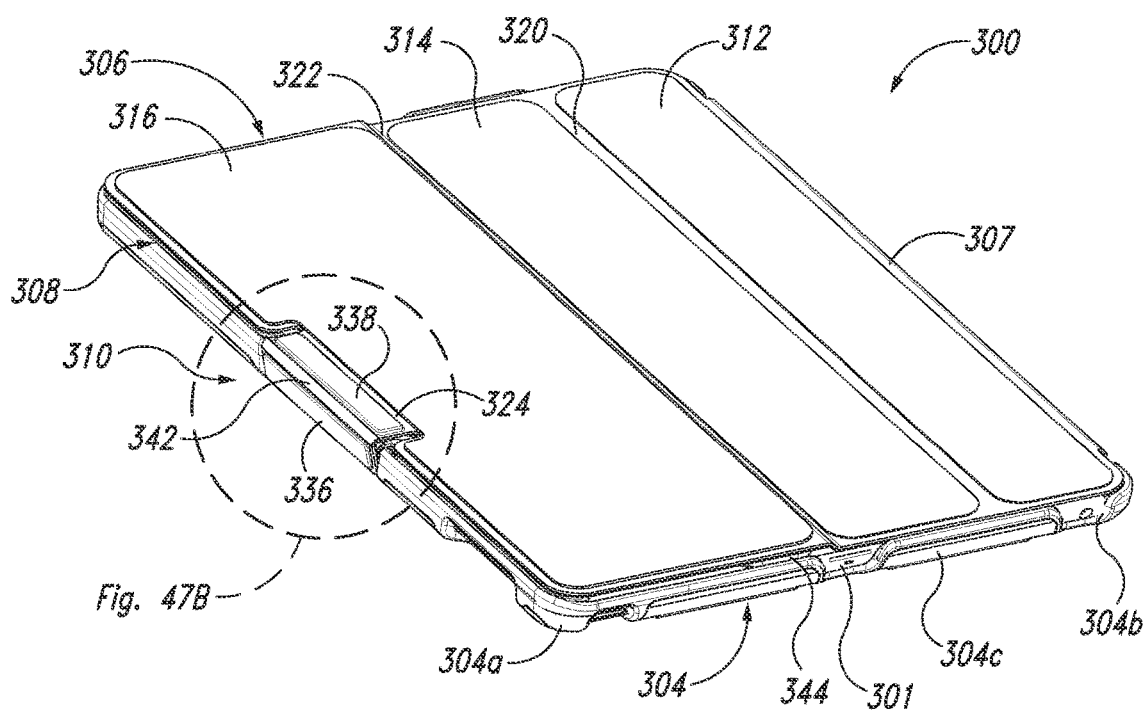
FIG. 47A is a perspective view of the case and the electronic device shown in FIG. 33 and the keyboard overlay shown in FIG. 43A with the cover in a closed configuration and the keyboard overlay in the operable position.
Figure 47B:
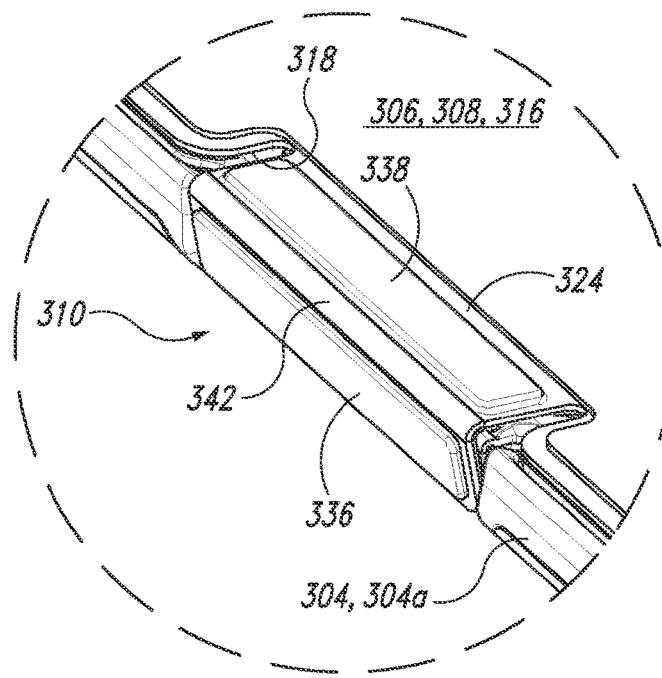
FIG. 47B is an enlargement of a portion of FIG. 47A.
Figure 48A:
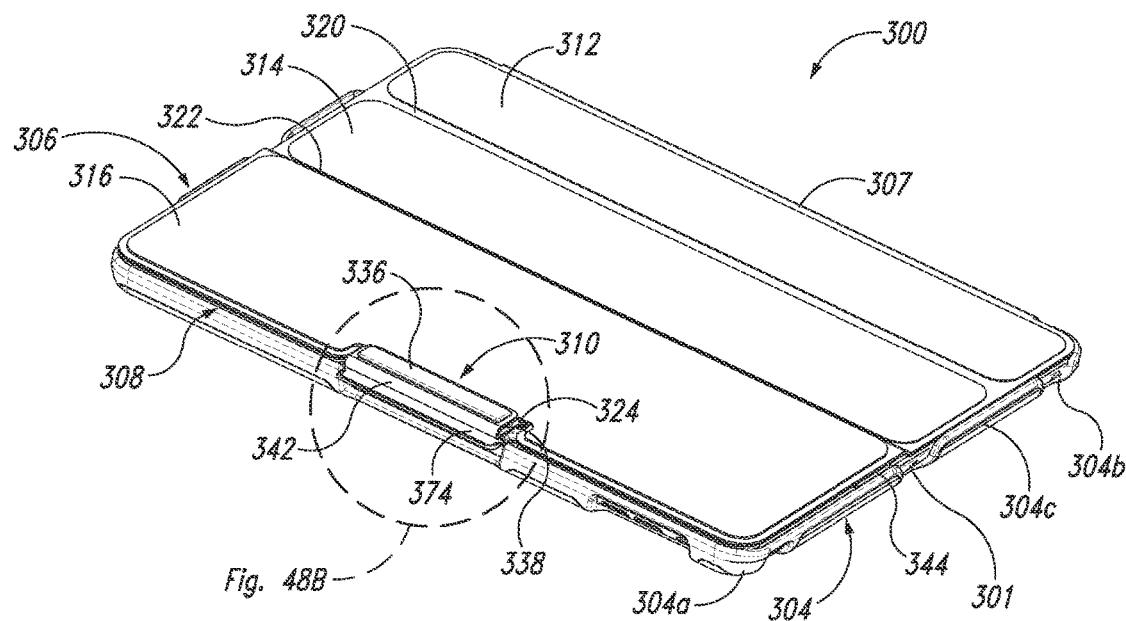
FIG. 48A is a perspective view of the of the case and the electronic device shown in FIG. 33 and the keyboard overlay shown in FIG. 43A with the screen protector disposed along a front side of the electronic device, the keyboard overlay in the operable position, and the tab folded.
Figure 48B:
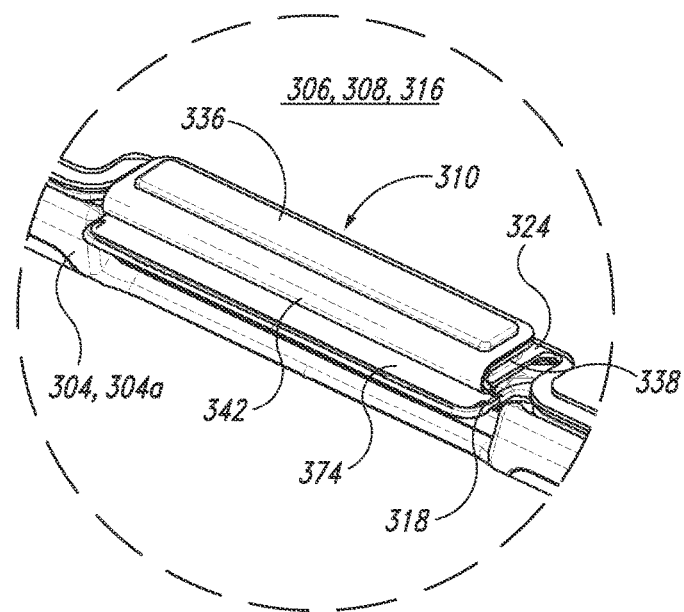
FIG. 48B is an enlargement of a portion of FIG. 48A.

FIG. 46 is a perspective view of the case 300, the electronic device 301, and the keyboard overlay 344, with the cover 306 in an extended configuration and the keyboard overlay 344 in an operable position. FIG. 47A is a perspective view of the case 300, the electronic device 301, and the keyboard overlay 344, with the cover 306 in a closed configuration and the keyboard overlay 344 in the operable position. FIG. 47B is an enlargement of a portion of FIG. 47A. FIG. 48A is a perspective view of the case 300, the electronic device 301, and the keyboard overlay 344, with the screen protector 308 disposed along the front side of the electronic device 301, the keyboard overlay 344 in the operable position, and the tab 310 folded. FIG. 48B is an enlargement of a portion of FIG. 48A. With reference to FIGS. 46-47B together, the keyboard overlay 344 can include a centrally positioned grip 374 adjacent to the magnetic region 368 of the keyboard overlay 344. In the illustrated embodiment, the grip 374 is a resilient flap that is resiliently bent when the backing 304 is securely attached to the electronic device 301, the keyboard overlay 344 is in the operable position, and the cover 306 is in the closed configuration. In other embodiments, the grip 374 can have another suitable form or be absent. When present, the grip 374 can underlie the tab 310 when the backing 304 is securely attached to the electronic device 301, the keyboard overlay 344 is in the operable position, and the cover 306 is in the closed configuration. Folding the tab 310 when the backing 304 is securely attached to the electronic device 301, the keyboard overlay 344 is in the operable position, and the cover 306 is in the closed configuration can expose at least a portion of the grip 374.

In at least some cases, folding the tab 310 also changes whether the magnetic region 368 of the keyboard overlay 344 preferentially stays with the electronic device 301 or with the cover 306 when the cover 306 is moved into the open configuration. For example, a magnetic attachment between the keyboard overlay 344 and the tab 310 can be weaker than a magnetic attachment between the keyboard overlay 344 and the electronic device 301 when the keyboard overlay 344 is in the operable position and the cover 306 is in the closed configuration. Thus, if the tab 310 remains unfolded when the cover 306 moves into the open configuration, the keyboard overlay 344 may tend to remain with the electronic device 301. In contrast, the magnetic attachment between the keyboard overlay 344 and the tab 310 can be stronger than the magnetic attachment between keyboard overlay 344 and the electronic device 301 when the backing 304 is securely attached to the electronic device 301, the keyboard overlay 344 is in the operable position, the screen protector 308 is disposed along the front side of the electronic device 301, and the tab 310 is folded. Thus, if the tab 310 remains folded when the cover 306 moves into the open configuration, the keyboard overlay 344 may tend to remain with the cover 306. A user of the case 300, therefore, may be able to manipulate the tab 310 to select whether or not the keyboard overlay 344 will remain deployed in the operable position when the cover 306 is opened. In addition or alternatively, a user of the case 300 can manipulate the grip 374 to select whether or not the keyboard overlay 344 will remain deployed in the operable position when the cover 306 is opened, such as in a manner similar to the manner described above with reference to FIGS. 23 and 24 for the case 100.

Figure 49:
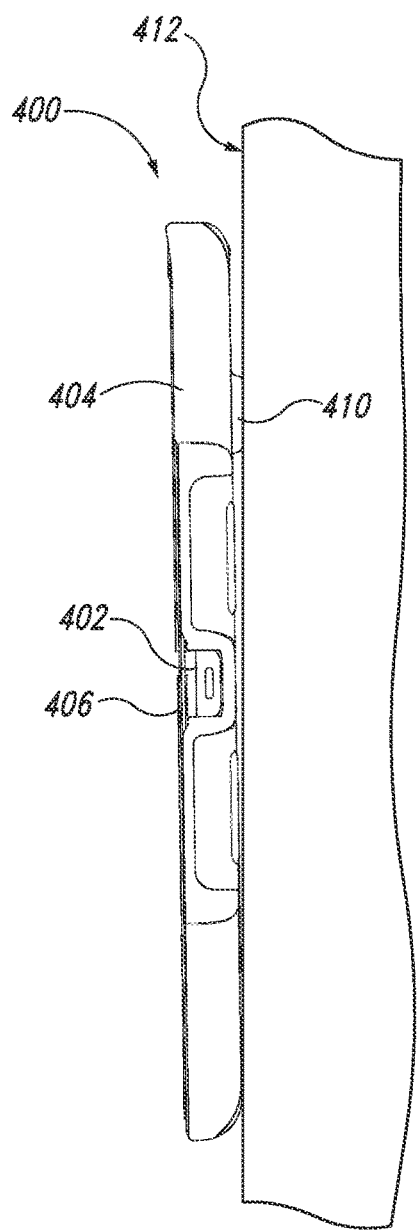
FIG. 49 is a side profile view of a protective case configured in accordance with another embodiment of the present technology and an associated electronic device. The case can include a backing, a cover, and a joint therebetween.

FIG. 49 is a side profile view of a protective case 400 configured in accordance with another embodiment of the present technology and an associated electronic device 402. The protective case 400 can correspond to the protective case 300 described above with reference to FIGS. 33-48B, except with the third and fourth magnetic regions 338, 340 (FIG. 34) omitted. With reference to FIG. 49, the case 400 can include a backing 404, a cover 406, and a joint 408 therebetween. The backing 404 can include a rearwardly protruding magnetic region 410 similar to the first magnetic region 334 of the backing 304 of the case 300 described above with reference to FIGS. 33-48B. In FIG. 49, the cover 406 is shown in a closed configuration and the case 400 is shown magnetically attached to a vertical metal surface 412 (e.g., a refrigerator door) via the magnetic region 410. The magnetic force associated with the magnetic region 410 can be sufficient to support the case 400 and the electronic device 402 as shown in FIG. 49. In at least some embodiments, the magnetic region 410 acts as a fulcrum. Accordingly, the case 400 and the electronic device 402 may tend to tilt off vertical by gravity when the magnetic region 410 is connected to the vertical metal surface 412. For example, the case 400 and the electronic device 402 can tilt such that a screen (not shown) of the electronic device 402 is oriented slightly downward relative to a fully vertical orientation.

Figure 50:
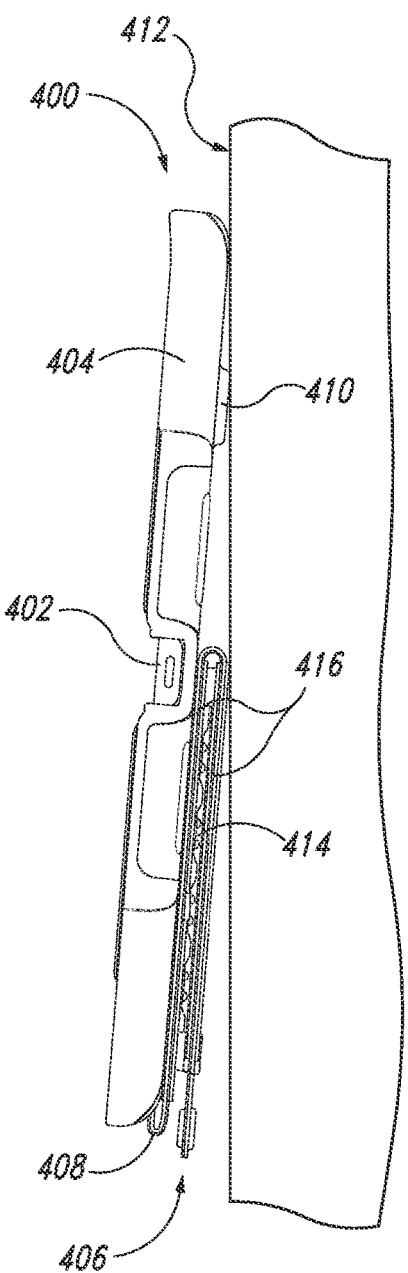
FIG. 50 is a side profile view of the case and the electronic device shown in FIG. 49 and an associated keyboard overlay.

FIG. 50 is a side profile view of the case 400, the electronic device 402, and a keyboard overlay 414. In FIG. 50, the case 400 is shown magnetically attached to the vertical metal surface 412 via the magnetic region 410 and the cover 406 and the keyboard overlay 414 are shown stowed between the backing 404 and the vertical metal surface 412. The cover 406 can be stowed in a folded configuration and the keyboard overlay 414 can be stowed between folded portions of the cover 406. As shown in FIG. 50, the combined thickness of the folded cover 406 and the keyboard overlay 414 can cause the case 400 and the electronic device 402 to tilt (again with the magnetic region 410 acting as a fulcrum) such that the screen of the electronic device 402 is oriented slightly upward relative to a fully vertical orientation. The tendency of the case 400 and the electronic device 402 to tilt downward by gravity toward their positions shown in FIG. 49 can prevent the folded cover 406 and the keyboard overlay 414 from falling out of their stowed positions. The same can be true when the folded cover 406 is stowed behind the backing 404 without the keyboard overlay 414. In its orientation shown in FIG. 50, the electronic device 402 can be well positioned for handsfree viewing, such as for watching video on the electronic device 402 while standing relatively far away from the electronic device 402.

CONCLUSION

This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments of the present technology.

We claim:

1. A protective case for use with a slab-shaped electronic device having a front side, a screen at the front side, and a back side opposite to the front side, the case comprising:
    a backing shaped to securely attach to the back side of the electronic device, the backing including a first magnetic region;
    a cover hingedly connected to the backing, the cover including—
        a screen protector, and
        a tab hingedly connected to the screen protector, the tab having—
            a first side,
            a second side opposite to the first side,
            a second magnetic region, and
            a third magnetic region hingedly connected to the second magnetic region; and
    a joint operably positioned between the backing and the cover, the screen protector being proximally connected to the joint, the joint being bendable along a bending axis to allow the cover to move between—
        a closed configuration in which the backing is securely attached to the electronic device, the first and second magnetic regions are detached from one another, the screen protector is disposed along the front side of the electronic device, the first side of the tab faces toward the electronic device, and the second side of the tab faces away from the electronic device, and
        an open configuration in which the backing is securely attached to the electronic device, the first and second magnetic regions are releasably attached to one another, the first side of the tab faces away from the electronic device, the second side of the tab faces toward the electronic device, and the screen protector forms a support structure that supports the electronic device at an angle relative to a horizontal support surface,
    wherein—
        the first magnetic region has an outwardly oriented distribution of magnetic polarities parallel to the bending axis,
        the second magnetic region has—
            a first distribution of magnetic polarities parallel to the bending axis at the first side of the tab when the tab is fully extended distally from the screen protector, and
            a second distribution of magnetic polarities parallel to the bending axis at the second side of the tab when the tab is fully extended distally from the screen protector,
        the third magnetic region has—
            a first distribution of magnetic polarities parallel to the bending axis at the first side of the tab when the tab is fully extended distally from the screen protector, and
            a second distribution of magnetic polarities parallel to the bending axis at the second side of the tab when the tab is fully extended distally from the screen protector, and
        the first distribution of magnetic polarities of the second magnetic region and the first distribution of magnetic polarities of the third magnetic region are different.

2. The protective case of claim 1 wherein the first distribution of magnetic polarities of the second magnetic region is an inverse of the first distribution of magnetic polarities of the third magnetic region.

3. The protective case of claim 1 wherein the first distribution of magnetic polarities of the second magnetic region and the first distribution of magnetic polarities of the third magnetic region are different alternating polarity distributions.

4. The protective case of claim 1 wherein the second distribution of magnetic polarities of the second magnetic region and the second distribution of magnetic polarities of the third magnetic region are complementary for registered magnetic attachment of the second and third magnetic regions to one another such that the tab can be folded with the second and third magnetic regions magnetically attached to one another and overlapping.

5. The protective case of claim 1 wherein the distribution of magnetic polarities of the first magnetic region and the second distribution of magnetic polarities of the second magnetic region are complementary for registered magnetic attachment of the first and second magnetic regions to one another when the cover is in the open configuration.

6. The protective case of claim 1 wherein:
the backing includes a fourth magnetic region disposed between the first magnetic region and the joint;
the fourth magnetic region has an outwardly oriented distribution of magnetic polarities parallel to the bending axis;
the distribution of magnetic polarities of the fourth magnetic region and the second distribution of magnetic polarities of the third magnetic region are complementary for registered magnetic attachment of the third and fourth magnetic regions to one another when the cover is in the open configuration; and
the distribution of magnetic polarities of the first magnetic region and the distribution of magnetic polarities of the fourth magnetic region are different.

7. The protective case of claim 1 wherein the second and third magnetic regions are elongate with respective lengths parallel to the bending axis.

8. The protective case of claim 7 wherein the first magnetic region is elongate with a length parallel to the bending axis.

9. The protective case of claim 1 wherein:
the joint is a first joint;
the screen protector includes—
 a proximal panel closest to the first joint,
 a distal panel furthest from the first joint,
 an intermediate panel between the proximal and distal panels,
 a second joint operably positioned between the proximal and intermediate panels, and
 a third joint operably positioned between the intermediate and distal panels,
 a fourth joint operably positioned between the distal panel and the tab; and
the tab includes a fifth joint operably positioned between the second and third magnetic regions.

10. The protective case of claim 9 wherein the fifth joint is a flexure bearing.

11. The protective case of claim 9 wherein:
the distal panel includes a distally oriented inset; and
the tab is positioned at least partially within the inset.

12. A protective case for use with a slab-shaped electronic device having a front side, a screen at the front side, a back side opposite to the front side, a leading edge extending between the front and back sides, and a trading edge opposite to the leading edge, the case comprising:
a backing including—
 a leading end portion configured to receive the leading edge of the electronic device,
 a first inset at the leading end portion, wherein the first inset defines a recess,
 a trailing end portion configured to receive the trailing edge of the electronic device,
 a middle portion extending between the leading and trailing end portions,
 a magnetic region at the middle portion, and
 a magnetic region at the recess,
a cover hingedly connected to the backing, the cover including—
 a screen protector, wherein the screen protector includes—
  a proximal pane closest to the joint, and
  a distal panel furthest from the joint, the distal panel including a distally oriented second inset, and
 a tab hingedly connected to the screen protector, wherein the tab has a magnetic region, and wherein the tab is positioned at least partially within the second insert; and
a joint operably positioned between the backing and the cover, the joint being bendable along a bending axis to allow the cover to move between—
 a closed configuration in which the backing is securely attached to the electronic device, the magnetic region at the at the middle portion of the backing and the magnetic region of the tab are detached from one another, the screen protector is disposed along the front side of the electronic device, and at least a portion of the tab is magnetically stowed within the first inset, and
 an open configuration in which the backing is securely attached to the electronic device, the magnetic region at the at the middle portion of the backing and the magnetic region of the tab are releasably attached to one another, and the screen protector forms a support structure that Supports the electronic device at an angle relative to a horizontal support surface.

13. A system, comprising:
a slab-shaped electronic device having a front side, a screen at the front side, a back side opposite to the front side, a leading edge extending between the front and back sides, and a trailing edge opposite to the leading edge; and
a protective case, including—
 a backing shaped to securely attach to the back side of the electronic device, the backing including—
  a leading end portion configured to receive the leading edge of the electronic device,
  an inset at the leading end portion, the inset defining a window, and
  a trailing end portion configured to receive the trailing edge of the electronic device,
 a cover hingedly connected to the backing the cover including—
  a screen protector, and
  a tab hingedly connected to the screen protector, the tab having a first side and a second side opposite to the first side, and
 a joint operably positioned between the backing and the cover, the screen protector being proximally connected to the joint, the joint being bendable along a bending axis to allow the cover to move between—
  a closed configuration in which the backing is securely attached to the electronic device, the tab is magnetically attached to electronic device via the window, the screen protector is disposed along the front side of the electronic device, the first side of the tab faces toward the electronic device, and the second side of the tab faces away from the electronic device, and
  an open configuration in which the backing is securely attached to the electronic device, the tab is magnetically attached to the backing between the leading end portion of the backing and the trailing end portion of the backing, the first side of the tab faces away from the electronic device, and the second side of the tab faces toward the electronic device, wherein—
the backing includes a first magnetic region having an outwardly oriented distribution of magnetic polarities parallel to the bending axis,
the tab includes a second magnetic region having—
a first distribution of magnetic polarities parallel to the bending axis at the first side of the tab when the tab is fully extended distally from the screen protector, and
a second distribution of magnetic polarities parallel to the bending axis at the second side of the tab when the tab is fully extended distally from the screen protector;
the screen protector has a first side and an opposite second side, the first side facing toward the electronic device when the cover is in the closed configuration,
the screen protector includes—
a proximal panel closest to the joint,
a distal panel furthest from the joint, and
a third magnetic region fixedly connected to the distal panel, the third magnetic region having—
a first distribution of magnetic polarities parallel to the bending axis at the first side of the screen protector when the screen protector is fully extended distally from the joint, and
a second distribution of magnetic polarities parallel to the bending axis at the second side of the screen protector when the screen protector is fully extended distally from the joint, and
the first distribution of magnetic polarities of the second magnetic region and the first distribution of magnetic polarities of the third magnetic region are different.

14. A system, comprising:
a slab-shaped electronic device having a front side, a screen at the front side, a back side opposite to the front side, a leading edge extending between the front and back sides and a trailing edge opposite to the leading edge; and
a protective case, including—
a backing shaped to securely attach to the back side of the electronic device, the backing including—
a leading end portion configured to receive the leading edge of the electronic device,
an inset at the leading end portion, the inset defining a window, and
a trailing end portion configured to receive the trailing edge of the electronic device,
a cover hingedly connected to the backing the cover including—
a screen protector, and
a tab hingedly connected to the screen protector, the tab having a first side and a second side opposite to the first side, and
a joint operably positioned between the backing and the cover, the screen protector being proximally connected to the joint, the joint being bendable along a bending axis to allow the cover to move between—
a closed configuration in which the backing is securely attached to the electronic device, the tab is magnetically attached to electronic device via the window, the screen protector is disposed along the front side of the electronic device, the first side of the tab faces toward the electronic device, and the second side of the tab faces away from the electronic device, and
an open configuration in which the backing is securely attached to the electronic device, the tab is magnetically attached to the backing between the leading end portion of the backing and the trailing end portion of the backing, the first side of the tab faces away from the electronic device, and the second side of the tab faces toward the electronic device,
wherein—
the backing includes a first magnetic region having an outwardly oriented distribution of magnetic polarities parallel to the bending axis,
the tab includes—
a second magnetic region having—
a first distribution of magnetic polarities parallel to the bending axis at the first side of the tab when the tab is fully extended distally from the screen protector, and
a second distribution of magnetic polarities parallel to the bending axis at the second side of the tab when the tab is fully extended distally from the screen protector;
a third magnetic region hingedly connected to the second magnetic region, the third magnetic region having—
a first distribution of magnetic polarities parallel to the bending axis at the first side of the tab when the tab is fully extended distally from the screen protector, and
a second distribution of magnetic polarities parallel to the bending axis at the second side of the tab when the tab is fully extended distally from the screen protector, and
the first distribution of magnetic polarities of the second magnetic region and the first distribution of magnetic polarities of the third magnetic region are different.

15. A system, comprising:
a slab-shaped electronic device having a front side, a screen at the front side, a back side opposite to the front side, a leading edge extending between the front and back sides, and a trailing edge opposite to the leading edge; and
a protective case, including—
a backing shaped to securely attach to the back side of the electronic device, the backing including—
a leading end portion configured to receive the leading edge of the electronic device,
an inset at the leading end portion, the inset defining a window, and
a trailing end portion configured to receive the trailing edge of the electronic device,
a cover hingedly connected to the backing, the cover including—
a screen protector, and
a tab hingedly connected to the screen protector, the tab having a first side and a second side opposite to the first side, and
a joint operably positioned between the backing and the cover, the screen protector being proximally connected to the joint, the joint being bendable along a bending axis to allow the cover to move between—
a closed configuration in which the backing is securely attached to the electronic device, the tab is magnetically attached to electronic device via the window, the screen protector is disposed along the front side of the electronic device, the first side of the tab faces toward the electronic device, and the second side of the tab faces away from the electronic device, and
an open configuration in which the backing is securely attached to the electronic device, the tab is magnetically attached to the backing between the leading end portion of the backing and the trailing end portion of the backing, the first side of the tab faces away from the electronic device, and the second side of the tab faces toward the electronic device, wherein—
the backing includes a first magnetic region having an outwardly oriented distribution of magnetic polarities parallel to the bending axis,
the tab includes—
a second magnetic region having—
a first distribution of magnetic polarities parallel to the bending axis at the first side of the tab when the tab is fully extended distally from the screen protector, and
a second distribution of magnetic polarities parallel to the bending axis at the second side of the tab when the tab is fully extended distally from the screen protector,
the electronic device includes a magnetic region at least proximate to the leading edge of the electronic device, the magnetic region of the electronic device having—
a first distribution of magnetic polarities parallel to the bending axis at the front side of the electronic device when the backing is securely attached to the electronic device, and
a second distribution of magnetic polarities parallel to the bending axis at the back side of the electronic device when the backing is securely attached to the electronic device, and
the first distribution of magnetic polarities of the second magnetic region and the second distribution of magnetic polarities of the magnetic region of the electronic device are complementary for registered magnetic attachment of the second magnetic region and the magnetic region of the electronic device to one another when the cover is in the closed configuration.

16. A system comprising:
a slab-shaped electronic device having a front side, a screen at the front side, a back side opposite to the front side, a leading edge extending between the front and back sides, and a trailing edge opposite to the leading edge,
a protective case, including—
a backing shaped to securely attach to the back side of the electronic device, the backing including—
a leading end portion configured to receive the leading edge of the electronic device,
an inset at the leading end portion, the inset defining a window, and
a trailing end portion configured to receive the trailing edge of the electronic device,
a cover hingedly connected to the backing, the cover including—
a screen protector, and
a tab hingedly connected to the screen protector, the tab having a first side and a second side opposite to the first side, and
a joint operably positioned between the backing and the cover, the screen protector being proximally connected to the joint the joint being bendable along a bending axis to allow the cover to move between—
a closed configuration in which the backing is securely attached to the electronic device, the tab is magnetically attached to electronic device via the window, the screen protector is disposed along the front side of the electronic device, the first side of the tab faces toward the electronic device, and the second side of the tab faces away from the electronic device, and
an open configuration in which the backing is securely attached to the electronic device, the tab is magnetically attached to the backing between the leading end portion of the backing and the trailing end portion of the backing, the first side of the tab faces away from the electronic device, and the second side of the tab faces toward the electronic device, and
a keyboard overlay having—
a first side,
a second side opposite to the first side, and
an operable position on the front side of the electronic device with the first side of the keyboard overlay facing toward the electronic device,
wherein—
the keyboard overlay includes a magnetic region having a distribution of magnetic polarities parallel to the bending axis at the first side of the keyboard overlay when the backing is securely attached to the electronic device and the keyboard overlay is in the operable position;
the electronic device includes a magnetic region at least proximate to the leading edge of the electronic device, the magnetic regio of the electronic device having a distribution of magnetic polarities parallel to the bending axis at the front side of the electronic device when the backing is securely attached to the electronic device; and
the distribution of magnetic polarities of the magnetic region of the electronic device and the distribution of magnetic polarities of the magnetic region of the keyboard overlay are complementary for registered magnetic attachment of the magnetic region of the electronic device and the magnetic region of the keyboard overlay to one another when the backing is securely attached to the electronic device and the keyboard overlay is in the operable position.

17. The system of claim 16 wherein:
the backing includes a first magnetic region having an outwardly oriented distribution of magnetic polarities parallel to the bending axis;
the tab includes—
a second magnetic region having—
a first distribution of magnetic polarities parallel to the bending axis at the first side of the tab when the tab is fully extended distally from the screen protector, and
a second distribution of magnetic polarities parallel to the bending axis at the second side of the tab when the tab is fully extended distally from the screen protector;
a third magnetic region hingedly connected to the second magnetic region, the third magnetic region having— a first distribution of magnetic polarities parallel to the bending axis at the first side of the tab when the tab is fully extended distally from the screen protector, and a second distribution of magnetic polarities parallel to the bending axis at the second side of the tab when the tab is fully extended distally from the screen protector;

the distribution of magnetic polarities of the magnetic region of the electronic device is a first distribution of magnetic polarities of the magnetic region of the electronic device;

the magnetic region of the electronic device includes a second distribution of magnetic polarities parallel to the bending axis at the back side of the electronic device when the backing is securely attached to the electronic device;

the first distribution of magnetic polarities of the second magnetic regio and the second distribution of magnetic polarities of the magnetic region of the electronic device are complementary for registered magnetic attachment of the second magnetic region and the magnetic region of the electronic device to one another when the cover is in the closed configuration;

the distribution of magnetic polarities of the magnetic region of the keyboard overlay is a first distribution of magnetic polarities of the magnetic region of the keyboard overlay;

the magnetic region of the keyboard overlay includes a second distribution of magnetic polarities parallel to the bending axis at the second side of the keyboard overlay when the backing is securely attached to the electronic device and the keyboard overlay is in the operable position; and the first distribution of magnetic polarities of the third magnetic region and the second distribution of magnetic polarities of the magnetic region of the keyboard overlay are complementary for registered magnetic attachment of the third magnetic region and the magnetic region of the keyboard overlay to one another when the cover is in the closed configuration.

18. The system of claim 17 wherein the first distribution of magnetic polarities of the second magnetic region and the first distribution of magnetic polarities of the third magnetic region are different.

19. The system of claim 18 wherein:

the second distribution of magnetic polarities of the second magnetic region and the second distribution of magnetic polarities of the third magnetic region are complementary for registered magnetic attachment of the second and third magnetic regions to one another such that the tab can be folded with the second and third magnetic regions magnetically attached to one another and overlapping;

the keyboard overlay includes a grip underlying the tab when the backing is securely attached to the electronic device, the keyboard overlay is in the operable position, and the cover is in the closed configuration; and folding the tab when the backing is securely attached to the electronic device, the keyboard overlay is in the operable position, and the cover is in the closed configuration exposes at least a portion of the grip.

20. The system of claim 19 wherein the grip is a resilient flap that is resiliently bent when the backing is securely attached to the electronic device, the keyboard overlay is in the operable position, and the cover is in the closed configuration.

21. The system of claim 20 wherein a magnetic attachment between the keyboard overlay and the tab is stronger than a magnetic attachment between the keyboard overlay and the electronic device when the backing is securely attached to the electronic device, the keyboard overlay is in the operable position, the screen protector is disposed along the front side of the electronic device, and the tab is folded.

22. The system of claim 21 wherein the magnetic attachment between the keyboard overlay and the tab is weaker than the magnetic attachment between the keyboard overlay and the electronic device when the keyboard overlay is in the operable position and the cover is in the closed configuration.

* * * * *